United States Patent
Clymans

(10) Patent No.: US 10,161,380 B2
(45) Date of Patent: *Dec. 25, 2018

(54) DEVICE AND METHOD FOR PLACING COMPONENTS OF A STRUCTURE

(71) Applicant: High Wind N.V., Zwijndrecht (BE)

(72) Inventor: Etienne Clymans, Willebroek (BE)

(73) Assignee: High Wind N.V., Zwijndrecht (BE)

( * ) Notice: Subject to any disclaimer, the term of this patent is extended or adjusted under 35 U.S.C. 154(b) by 393 days.

This patent is subject to a terminal disclaimer.

(21) Appl. No.: 14/653,313

(22) PCT Filed: Dec. 20, 2013

(86) PCT No.: PCT/IB2013/061198
§ 371 (c)(1),
(2) Date: Jun. 18, 2015

(87) PCT Pub. No.: WO2014/097250
PCT Pub. Date: Jun. 26, 2014

(65) Prior Publication Data
US 2015/0337798 A1  Nov. 26, 2015

(30) Foreign Application Priority Data

Dec. 20, 2012 (BE) .................................. 2012/0865
Mar. 28, 2013 (BE) .................................. 2013/0215

(51) Int. Cl.
*F03D 13/10* (2016.01)
*F03D 1/00* (2006.01)
(Continued)

(52) U.S. Cl.
CPC .............. *F03D 1/005* (2013.01); *B66C 13/06* (2013.01); *B66C 23/185* (2013.01); *B66C 23/52* (2013.01);
(Continued)

(58) Field of Classification Search
CPC ......... B66C 23/00; B66C 23/06; B66C 23/18; B66C 23/185; B66C 23/207; B66C 23/26;
(Continued)

(56) References Cited

U.S. PATENT DOCUMENTS 8,317,244 B1   11/2012   Schuyleman
2007/0266538 A1   11/2007   Bervang
(Continued)

FOREIGN PATENT DOCUMENTS

DE          29908395 U1    9/1999
DE       102011015881 A1   10/2012
(Continued)

OTHER PUBLICATIONS

ISR/WO (PCT/IB2013/058167) for related U.S. Appl. No. 14/424,272, dated Mar. 3, 2015.
(Continued)

*Primary Examiner* — Minh Truong
*Assistant Examiner* — Juan J Campos, Jr.
(74) *Attorney, Agent, or Firm* — The Webb Law Firm

(57) ABSTRACT

A device for placing components of a structure, in particular a wind turbine includes hoisting means placed on a surface, a boom of which is provided with a hoisting cable with attaching means for a component for placing, wherein a lifting plane is defined by the boom and the free-hanging hoisting cable. The boom includes a guide device for the attaching means. The guide device is connected to the boom by means of a displacing device displaceable along a longitudinal axis of the boom. The guide device is configured to limit movement of the attaching means in a direction running transversely of the lifting plane, and further includes a catching construction configured to receive and displace the attaching means parallel to the lifting plane between a (Continued)

position in the vicinity of the boom and a position further removed from the boom and/or vice versa.

28 Claims, 20 Drawing Sheets

(51) Int. Cl.
*F03D 1/06* (2006.01)
*B66C 13/06* (2006.01)
*B66C 23/18* (2006.01)
*B66C 23/52* (2006.01)
*F03D 13/25* (2016.01)
*F03D 13/40* (2016.01)

(52) U.S. Cl.
CPC .............. *F03D 1/06* (2013.01); *F03D 13/10* (2016.05); *F03D 13/25* (2016.05); *F03D 13/40* (2016.05); *F05B 2240/95* (2013.01); *Y02E 10/721* (2013.01); *Y02E 10/727* (2013.01); *Y02P 70/523* (2015.11); *Y10T 29/49318* (2015.01)

(58) Field of Classification Search
CPC ....... B66C 23/52; B66C 23/525; B66C 23/53; B66C 23/60; B66C 23/605; B66C 13/00; B66C 13/04; B66C 13/06; B66C 13/10; F03D 13/10
See application file for complete search history.

(56) References Cited

U.S. PATENT DOCUMENTS

| 2008/0216301 | A1* | 9/2008 | Hansen ................... B66C 1/108 29/428 |
| 2008/0307647 | A1 | 12/2008 | Kessler |
| 2009/0025219 | A1 | 1/2009 | Hansen et al. |
| 2011/0094987 | A1 | 4/2011 | Botwright et al. |
| 2011/0123274 | A1* | 5/2011 | Soe-Jensen ........... B63B 35/003 405/195.1 |
| 2011/0221215 | A1 | 9/2011 | Botwright |
| 2013/0125397 | A1 | 5/2013 | Van den Berg |
| 2015/0368075 | A1* | 12/2015 | Clymans ............... B66C 23/185 212/273 |

FOREIGN PATENT DOCUMENTS

| DE | 102011116189 B3 | 10/2012 |
| EP | 2364949 A1 | 9/2011 |
| WO | 2008061797 A1 | 5/2008 |
| WO | 2009041812 A1 | 4/2009 |
| WO | 2012002809 A1 | 1/2012 |

OTHER PUBLICATIONS

ISR/WO for related U.S. Appl. No. 14/767,674 dated Apr. 23, 2014.

* cited by examiner

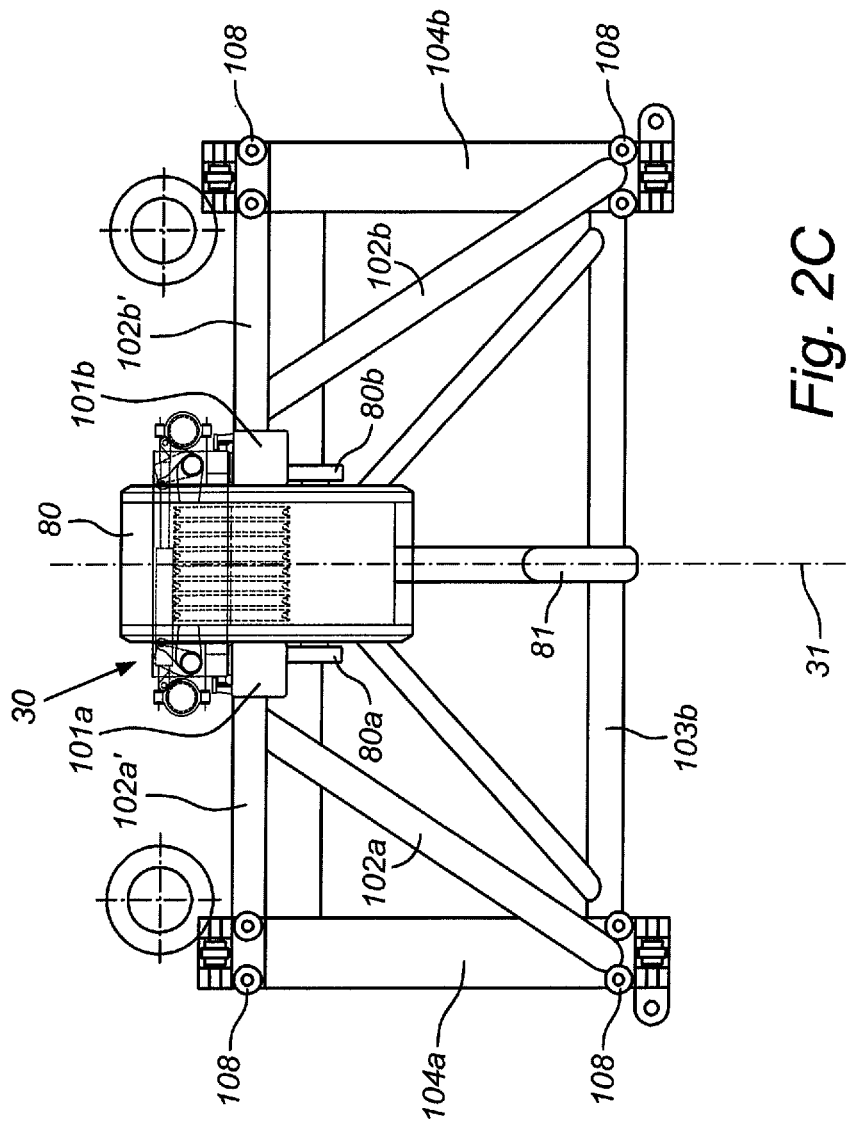

DEVICE AND METHOD FOR PLACING COMPONENTS OF A STRUCTURE

CROSS-REFERENCE TO RELATED APPLICATIONS

This application is the United States national phase of International Application No. PCT/IB2013/061198 filed Dec. 20, 2013, and claims priority to Belgian Patent Application Nos. 2012/0865 and 2013/0215 filed Dec. 20, 2012 and Mar. 28, 2013, respectively, the disclosures of which are hereby incorporated in their entirety by reference.

BACKGROUND OF THE INVENTION

Field of the Invention

The invention relates to a device for placing components of a structure. The invention likewise relates to a method for placing components of a structure. The invention relates particularly to a device and method for placing components of a wind turbine.

Description of Related Art

Although the invention will be elucidated mainly within the context of assembling a high structure such as a wind turbine at sea, the device and method according to the invention can expressly be used both on land (onshore) and at sea (offshore).

The number of high structures erected, maintained or repaired on land or at sea is growing. A typical example is a wind turbine comprising a gondola (or nacelle) which is placed on a mast and forms the housing for electromechanical equipment such as a power generator. The nacelle is also provided with a hub on which a number of rotor blades are arranged. The rotor blades convert the kinetic energy of the wind into a rotating movement of the shaft of the nacelle, which is converted into electrical energy by the power generator.

During the placing of components of such large structures the components are manipulated according to the prior art by a crane placed on a surface, and placed on an already available support structure for the structure. In the case of a wind turbine the support structure can for instance comprise a mast placed on a suitable foundation.

The lifting and placing of large, slender components, in particular wind turbine blades, is hampered by wind load. Wind turbine blades attached to the crane can be exposed here to great and unexpected movements relative to the support structure or relative to already installed components. This makes assembly very much more difficult, or even impossible in the case of strong wind load. A wind turbine blade has to be attached by means of bolt connections to a hub, this requiring a precise positioning of the wind turbine blade relative to a hub already installed on a mast.

SUMMARY OF THE INVENTION

An object of the present invention is to provide a device with which components of a structure, in particular a wind turbine, can be placed and mounted in a manner less susceptible to wind than is known in the prior art.

This object is achieved with a device having the characteristics according to claim 1. A device for placing components of a structure, in particular a wind turbine, comprises according to the invention a hoisting means placed on a surface, a boom of which is provided with a hoisting cable with attaching means, such as a hoisting tackle, to which a component for placing can be attached, wherein a lifting plane is defined by the boom and the free-hanging hoisting cable, wherein the boom further comprises a guide device for the attaching means which is connected to the boom by means of a displacing device displaceable along a longitudinal axis of the boom, and the guide device is configured to limit movement of the attaching means in a direction running transversely of the lifting plane, wherein the guide device further comprises a catching construction configured to receive and displace the attaching means parallel to the lifting plane between a position in the vicinity of the boom and a position further removed from the boom and/or vice versa.

By making use of a guide device with catching construction the movement of the attaching means is temporarily limited in at least two directions and made substantially independent of the wind load. The component can be positioned relative to a support structure by rotating the hoisting means about a vertical axis, rotating the boom of the hoisting means up and downward in the lifting plane and/or moving the attaching means up and downward with the hoisting cable. When a component has been brought into the vicinity of a part to which the component has to be coupled, the attaching means according to the invention is preferably temporarily received in or taken up by the catching construction. Because the catching construction is however configured to displace the attaching means parallel to the lifting plane between a position in the vicinity of the boom and a position further removed from the boom and/or vice versa, a substantially wind-independent fine positioning of the component is made possible.

The hoisting cable is the main hoisting cable of the hoisting means. Apart from the guide device with catching construction, the lifting and placing of a component is preferably performed according to the invention by applying a per se known hoisting means, in particular a crane, a boom of which is provided with a main hoisting cable provided at a free outer end thereof with an attaching means, in particular a hoisting block or hoisting tackle. Bypassing the guide device makes it possible to also use the hoisting means for other purposes. If desired, the hoisting block can be suspended according to the invention from a plurality of main hoisting cables. The attaching means can if desired be suspended from a plurality of main hoisting cables. It is thus possible for instance to apply two hoisting cables. In the case of a plurality of main hoisting cables the lifting plane is defined by the boom and a virtual hoisting cable with the same resultant force as the free-hanging hoisting cables.

A further advantage of the invented device is that it allows work to take place in highly unfavourable conditions, whereas the known device can only be deployed up to determined wind speeds. The assembly time of a structure on land or at sea can hereby be significantly reduced. The guide device can be easily displaced along the longitudinal axis of the boom, for instance away from the attaching means, whereby the hoisting means can operate as a hoisting means known from the prior art. By releasing the attaching means there continues to be good accessibility from the support surface of the surface to components to be taken up by the hoisting means. A further advantage of the invented device is that it can be realized in simple manner by providing the boom of a per se known crane with a guide device with catching construction and allowing the guide device to engage on or be coupled to the hoisting block of the main hoisting cable of this crane.

In the case the device is applied for assembly at sea of a structure constructed from components, in particular a wind turbine, the surface preferably comprises a vessel, and more preferably a jack-up platform. For assembly of the structure on land the surface can optionally be formed by the ground or for instance by a bearing structure provided for the hoisting means.

In an embodiment of the invention the device comprises a catching construction which is displaceable parallel to the lifting plane between a position in the vicinity of the boom and a position further removed from the boom and/or vice versa. An attaching means received in the catching construction can in this way be displaced efficiently between a position in the vicinity of the boom and a position further removed from the boom and/or vice versa. An outer surface of the attaching means is preferably formed such that the attaching means at different angles to the vertical direction can nevertheless be received close-fittingly in the catching construction. The different angles of the attaching means are for instance the result of varying boom angles for the purpose of realizing the correct reach. An adequate form of the outer surface can for instance be obtained by giving a section of the outer surface running parallel to the lifting plane a round shape. The attaching means is for instance held at a correct height position here relative to the guide device by wheels arranged on both sides of the attaching means. The movable catching construction can thus precisely enclose the attaching means with a fixed length, this at a varying angle of the attaching means relative to the guide device. In combination with an appropriate position control of the movable catching construction there is therefore no limitation to lifting/paying out or luffing within the active range of the guide device.

There are many ways in which the attaching means can be coupled to the guide device during use. In an embodiment of the invention a device is provided wherein the guide device can be coupled to the attaching means by means of co-acting coupling means, preferably of mechanical nature.

A particularly suitable device in this respect has coupling means comprising wheels which are provided on the attaching means and on which the guide device can rest while applying little force. An alternative embodiment comprises coupling means comprising wheels which are provided on the guide device and under or between which the attaching means can push while applying little force.

Another embodiment of the device according to the invention has the feature that the guide device comprises a frame of mutually connected beams, of which at least one beam, and preferably one forked beam, extends from the boom in the direction of the attaching means and at least partially encloses the attaching means. The at least one beam can for instance be connected to a base beam running in transverse direction of the boom. The at least one beam runs on one side or, in the case of a plurality of beams, on either side of the attaching means and therefore limits the movement of the attaching means in a direction transversely of the at least one beam (and the lifting plane). This embodiment has the advantage that movements of the attaching means in other directions, for instance in a lifting direction, are substantially unimpeded.

In an embodiment the at least one beam extends substantially perpendicularly of the longitudinal axis of the boom because in this way it covers the greatest distance from the boom. Although this distance is in principle not limited, a practical embodiment has the feature that the at least one beam extends from the boom over a perpendicular distance of a maximum of twice the boom width. This distance preferably amounts to no more than 1.5 times the boom width. The boom width is understood to mean the transverse dimension of the boom running perpendicularly of the longitudinal axis of the boom and perpendicularly of the direction of the beams (and the lifting plane). In an embodiment the guide device comprises a fork-like beam connected with two legs for displacement to the boom of the hoisting means, wherein the two legs come together in a direction away from the boom to form one main beam to which the catching construction is connected for travel, preferably on the underside of the main beam.

In another embodiment the device according to the invention comprises angle adjusting means configured to adjust the angle of the guide device to the boom. Suitable angle adjusting means comprise for instance a hydraulic or electric cylinder received in a leg of the guide device. The angular position of the guide device relative to the boom can be changed by imparting a movement to or retracting the cylinder or plurality of cylinders. The angle adjusting means are preferably configured such that they hold the guide device substantially horizontal irrespective of the angular position of the boom.

An embodiment of the invention is characterized in that the catching construction comprises a frame of mutually connected walls, two side walls of which extend parallel to the lifting plane from the boom in the direction of the attaching means, a rear wall of which is directed toward the boom and a front side of which remote from the boom is accessible by the hoisting means. This embodiment provides an operationally reliable catching construction for the attaching means, wherein the attaching means can be received in simple manner in the catching construction.

A suitable embodiment of the catching construction is characterized in that the front side comprises wall parts, such as catches, retractable and extendable in a direction transversely of the lifting plane, wherein the front side with retracted wall parts is accessible by the hoisting means and the front side with extended wall parts encloses an attaching means present in the catching construction.

Yet another embodiment of the device has the feature that the catching construction comprises linear displacing means for displacing the catching construction in a direction parallel to the lifting plane between a position in the vicinity of the boom and a position further removed from the boom and/or vice versa. Suitable linear displacing means comprise for instance hydraulic cylinders connected at an outer end to the frame of the catching construction and at another outer end to the boom and/or guide device. The catching construction can be displaced relative to the boom and/or the guide device by imparting a movement to the hydraulic cylinders.

According to the invention the guide device with the catching construction is displaceable along the longitudinal axis of the boom by means of a displacing device. An embodiment of the device has the feature that the displacing device comprises first guide means provided on the guide device and/or the catching construction and second guide means provided on the boom which co-act with the first guide means. In an advantageous embodiment the first guide means comprise a pair of wheels and the second guide means a T-beam, wherein the pair of wheels encloses a flange of the T-beam. This embodiment provides a smooth displacement along the boom wherein the pair of wheels ensures that the guide device provided with the catching construction cannot come away from the boom either in the direction of the boom or in a direction away from the boom or in the direction transversely of the boom.

A particularly advantageous embodiment of the device has the feature that the displacing device is configured so that the guide device and the catching construction follow the displacement of the attaching means in the case that the attaching means is raised or lowered. This is preferably realized with an embodiment in which the displacing device comprises a tensioning cable attached to the guide device and operated by a constant tension winch so that the tension force in the tensioning cable remains substantially constant, preferably in a manner such that the guide device and the catching construction rest on the attaching means while applying little vertical force. The attaching means is equipped for this purpose with a running wheel on each side, on which running wheels the guide and catching construction rest.

Another embodiment provides a device, the guide device of which comprises auxiliary devices, preferably a tugger winch with guide cable and/or a power source. This embodiment provides a guide device provided with a catching construction which can function autonomously and which need be connected if desired only to a per se known hoisting means. A lifted component can be engaged and manipulated with the guide cable (tugger cable) in order to enable a still more accurate positioning thereof. The guide cable is tightened or payed out by means of the tugger winch that is present. In a practical embodiment the tugger cable is guided along a across beam connected to the frame of the guide device by means of pulleys mounted on the cross beam.

Another embodiment provides a device, the attaching means of which is connected by means of a rigid or flexible connection to an attaching structure to which a component can be releasably attached. This embodiment has the advantage that the attaching structure can be chosen subject to the component for lifting. An embodiment in which the attaching means is connected by means of a rigid connection to the attaching structure is recommended because of a more precise positioning. In an embodiment wherein the attaching means is connected to an attaching structure by means of a rigid or flexible connection, the attaching structure forms part of the attaching means.

It is further advantageous here to characterize an embodiment of the device in that the rigid connection and/or the attaching structure comprises means for displacing and/or rotating respectively the attaching structure and/or parts of the attaching structure in three dimensions. This embodiment has the advantage that, after the component has been carried into the vicinity of the desired installation position by the hoisting means and after the attaching means has been immobilized at the correct position by the catching construction, the component can be displaced and rotated about a rotation axis in precise manner in order to carry the component accurately to the installation position. In the case of for instance a wind turbine blade, this feature provides the option of mounting the blade on a hub, even when the blade mounting of the hub forms an angle other than zero with the horizontal. Precise displacements of the attaching structure enable a blade to be mounted without additional movements of the hoisting means.

In an embodiment of the device according to the invention the attaching structure comprises a yoke. The yoke imparts the desired width to the attaching means during for instance lifting of a wind turbine blade, whereby tilting of the wind turbine blade is prevented. A preferred embodiment has the feature here that the attaching structure comprises a blade yoke.

A particularly advantageous embodiment of the invention provides a device, the attaching structure of which comprises a rotor blade spreader which can be oriented. The rotor blade spreader is an elongate structure with a longitudinal direction, a transverse direction and a vertical direction which in the present embodiment corresponds to the lifting direction. The spreader is provided with means for rotating the spreader round a longitudinal axis and a transverse axis and for pivoting thereof round a vertical axis, for instance by means of a motor-driven pinion. In addition, the length of the spreader in the longitudinal direction is preferably telescopically adjustable. It can thus be adjusted to the length of the engaging part of an elongate component, such as for instance a wind turbine blade. It is also advantageous for the spreader to be provided with a mechanism to enable sliding of the rotor blade in the longitudinal direction. The centre of gravity can hereby be made adjustable and the fastening bolts of a rotor blade can be pushed during assembly via a translation into the corresponding holes in the hub without additional displacement of the hoisting means. The spreader is further provided with engaging means in the form of for instance gripper arms, slings, clamping mechanisms and the like to enable securing of the component.

An embodiment of the device according to the invention has the feature that the attaching structure comprises a gripper. In another embodiment the attaching structure comprises slings for the purpose of enclosing a component, in particular a wind turbine blade. The slings are trained around a cross-section of the blade and prevent damage to the paint layer and other damage to the blade.

The device according to the invention is particularly suitable for manipulating components comprising a mast, a rotor blade and/or a nacelle of a wind turbine. The invented device enables assembly of offshore wind turbines up to wind speeds of 12 m/s and more, where with the known device the mast and nacelle can be assembled up to wind speeds of 10 m/s, a complete rotor (a hub on which three blades are mounted) up to 9 m/s, a nacelle with hub and two pre-mounted blades (the so-called bunny ear method) up to about 9 m/s and individual rotor blades up to 8 m/s.

The invention likewise relates to a method for placing components of a structure, in particular a wind turbine. The method comprises of providing a device according to the invention on a surface and placing the components on an available support structure using the hoisting means, wherein the movement of the attaching means is temporarily limited by the guide device by means of displacing the displacing device along the longitudinal axis of the boom to the position of the attaching means, receiving in the catching construction and displacing the attaching means parallel to the lifting plane between a position in the vicinity of the boom and a position further removed from the boom and/or vice versa. By making use of the device according to the invention a component, in particular a wind turbine blade, can be accurately positioned relative to and mounted on a support structure in windy conditions on land or at sea. The device conversely provides options for a new method of disassembling a structure on land or at sea, particularly the components of a wind turbine.

Another embodiment comprises a method in which the guide device with catching construction is displaced passively by means of a tensioning cable attached thereto with a substantially constant tension force along the longitudinal axis of the boom by lifting or lowering the attaching means. The guide device with catching construction rests here while applying relatively little weight on wheels mounted on each side of the attaching means.

A particularly suitable embodiment comprises the steps of
  a) taking up a component with the attaching means or the attaching structure;

b) tilting the boom upward until it runs so steeply that the attaching means comes within reach of the guide device;
c) displacing the guide device along the longitudinal axis of the boom until it rests on the wheels of the attaching means, after which the hoisting winch of the guide device is set into constant tension operation so that the guide device follows passively the displacements of the boom and attaching means;
d) pivoting the boom into the vicinity of the desired assembly position;
e) tilting the boom until the component is in the desired assembly position;
f) receiving the attaching means in the catching construction;
g) positioning the component in the desired assembly position by displacing the attaching means parallel to the lifting plane between a position in the vicinity of the boom and a position further removed from the boom and/or vice versa; and
h) connecting the component to the support structure.

When the catching construction is active and the attaching means is received therein, displacements of the boom for the purpose of correcting the reach are not limited. Raising and lowering of the attaching means via the hoisting cable are not limited either. The displacement of the attaching means relative to the guide device is made possible by a controlled displacement of the catching construction with hydraulic cylinders. The hoisting cables of the attaching means are held in the vertical position here so that no very great forces are exerted on the guide device. It is noted that a rotation of the attaching means around an axis directed perpendicularly of the lifting plane is made possible to a limited extent in the situation where it is received in the catching construction by modifying the geometry of the attaching means.

The device and method according to the invention are particularly suitable for hoisting and mounting a wind turbine blade in a substantially vertical position on a hub of a wind turbine.

BRIEF DESCRIPTION OF THE DRAWINGS

The invention will now be elucidated in more detail with reference to the accompanying figures, without otherwise being limited thereto. In the figures:

FIGS. 2A, 2B and 2C show respectively a schematic top side view, side view and front view of an embodiment of a guide device with catching construction according to the invention;

DETAILED DESCRIPTION OF THE INVENTION

Figure 1A:
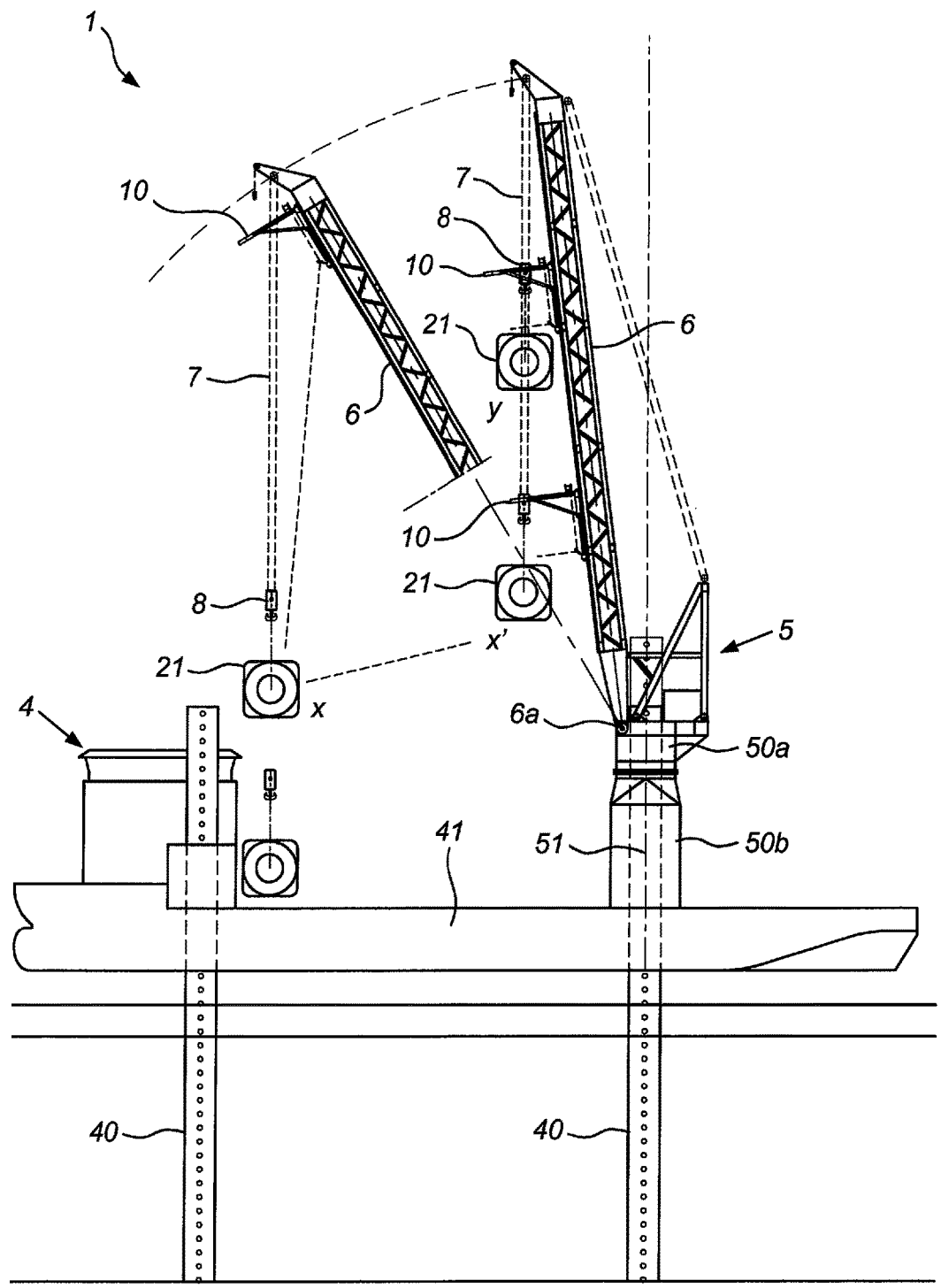
FIG. 1A-1B are schematic side views of an embodiment of the device according to the invention in different modes.
Figure 1B:
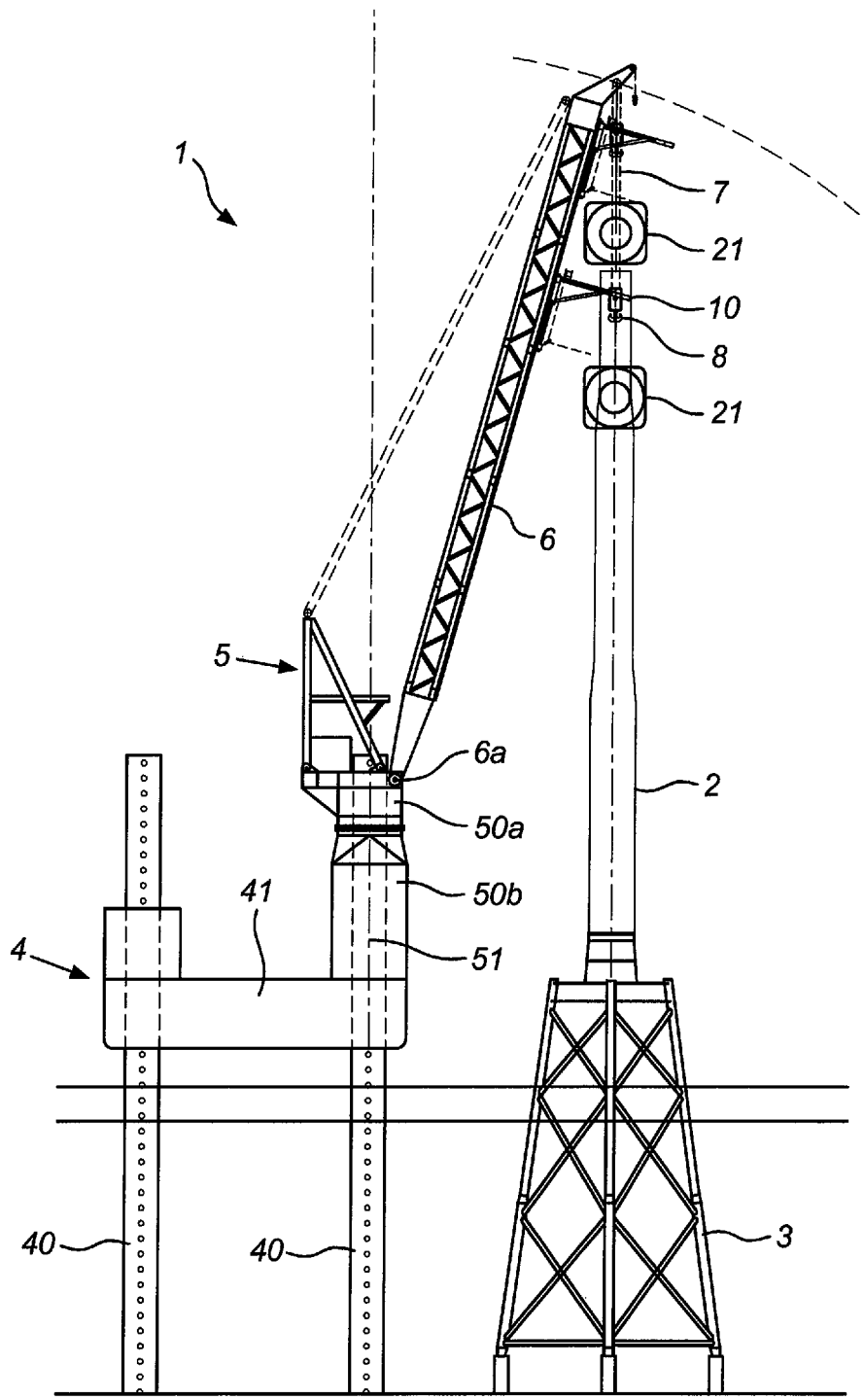

FIG. 1 shows a side view of different modes of a device 1 according to the invention. The shown embodiment is configured for placing at sea of components of a wind turbine on a support structure in the form of a jacket 3. It will be apparent that the invention is not limited to a support structure in the form of a jacket, and that any other foundation can be used. Driven piles (monopiles) with a so-called transition piece—a round transition structure located close to the waterline from monopile to mast mounting—can be applied in the case of for instance rather shallow water. Gravity-based foundations can also be applied in shallower water. In the case of deeper water or larger wind turbines so-called Tripods and Tripiles are also applied in addition to jackets. The components of the wind turbine to be placed comprise the wind turbine mast 2, nacelle 21, which is shown in different positions in FIGS. 1A-1B, and/or the rotor blades 22 of the wind turbine, wherein the advantages of the invention become particularly manifest in the placing of rotor blades 22. Device 1 comprises a hoisting means 5, preferably a crane, which is placed on a vessel 4 and a boom 6 of which is provided with a main hoisting cable 7 on which an attaching means such as a hoisting tackle 8 is arranged and to which a component for lifting can be releasably attached. Boom 6 and the (freely movable) hoisting cable 7 together form a lifting plane (which corresponds to the plane of the figure). Boom 6 is connected for pivoting around a fixed outer end 6a to a hoisting means platform 50a, which is in turn rotatable round a platform foundation 50b about a rotation axis 51. Boom 6 can be luffed in, i.e. raised, and luffed out, i.e. lowered, around pivot point 6a in known manner. In FIGS. 1A-1B hoisting tackle 8 is likewise shown in different positions and the component for lifting is a nacelle 21. Vessel 4 comprises a jack-up offshore platform provided with anchor piles 40 which support a work deck 41. Anchor piles 40 are movable in vertical direction to the seabed, and the height position of work deck 41 relative to the water level can be changed by displacing work deck 41 relative to piles 40 by means of (hydraulic) jacks or a gear rack-pinion drive system. If desired, work deck 41 is provided with storage locations for the components to be lifted and positioned. In order to enable the method according to the invention to be performed the vessel 4 is moored in the immediate vicinity of the support structure 3 available at sea, and in any case such that support structure 3 lies within reach of hoisting means 5 with boom 6 in luffed-out position.

According to the invention boom 6 comprises a guide device 10 for hoisting tackle 8 with which the movement of hoisting tackle 8 can be limited in at least one direction 61. This limited direction 61 will generally be a direction running transversely of the lifting plane and the longitudinal axis 60 of boom 6, although this is not essential. According to FIG. 2A hoisting tackle 8 generally comprises a hoisting block 80 and a hoisting hook 81. Hoisting tackle 8 is provided on both sides with wheels 80a and 80b on which guide device 10 can rest while applying little force. Because guide device 10 rests while applying relatively little weight on wheels (80a, 80b) of hoisting tackle 8, guide device 10 will follow hoisting tackle 8 in a substantially passive manner. A hoisting winch (not shown) of guide device 10 serves to absorb the relatively low weight, wherein the winch is preferably adjusted via a so-called constant tension operation mode. The greater part of the weight is absorbed by the tension force in the hoisting cable of guide device 10. The wheels (80a, 80b) of hoisting tackle 8 ensure that this hoisting tackle 8 encounters substantially no resistance forces in longitudinal direction (the direction of beams 101a, 101b) and so remains suspended vertically under the hoisting sheaves at the top of boom 6.

Guide device 10 is configured to limit movement of hoisting tackle 8 in a direction 61 running transversely of the lifting plane, while movement of hoisting tackle 8 in the lifting plane is not impeded to any significant extent by the guide device. The position of hoisting tackle 8 in the lifting plane is largely determined by the inclination of boom 6 relative to the vertical direction. This has the drawback that this position is not precisely fixed and is susceptible to wind and other forces. This is a great drawback in the placing of for instance rotor blades 22 in the hub of an already placed nacelle 21. A rotor blade 22 is generally connected to such a hub by a number of bolt connections, wherein placing has to take place very precisely. In order to enable such accurate placing, the device according to the invention comprises a catching construction 30 configured to receive and displace hoisting tackle 8 in the lifting plane between a position A in the vicinity of boom 6 and a position B further removed from the boom. Catching construction 30 is for this purpose displaceable in the lifting plane from the position A in the vicinity of the boom to the position B further removed from the boom.

Figure 2A:
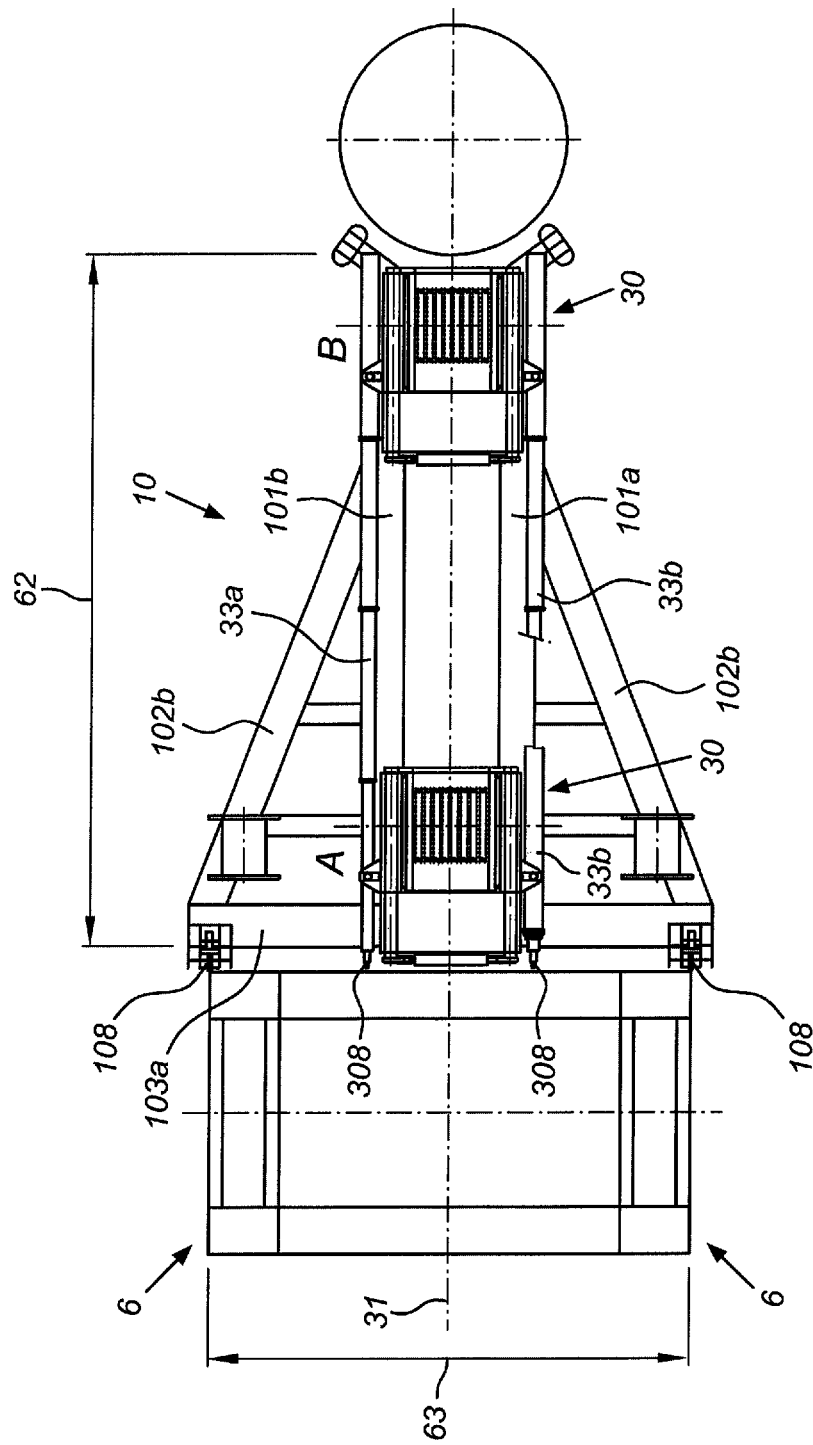
Figure 2B:
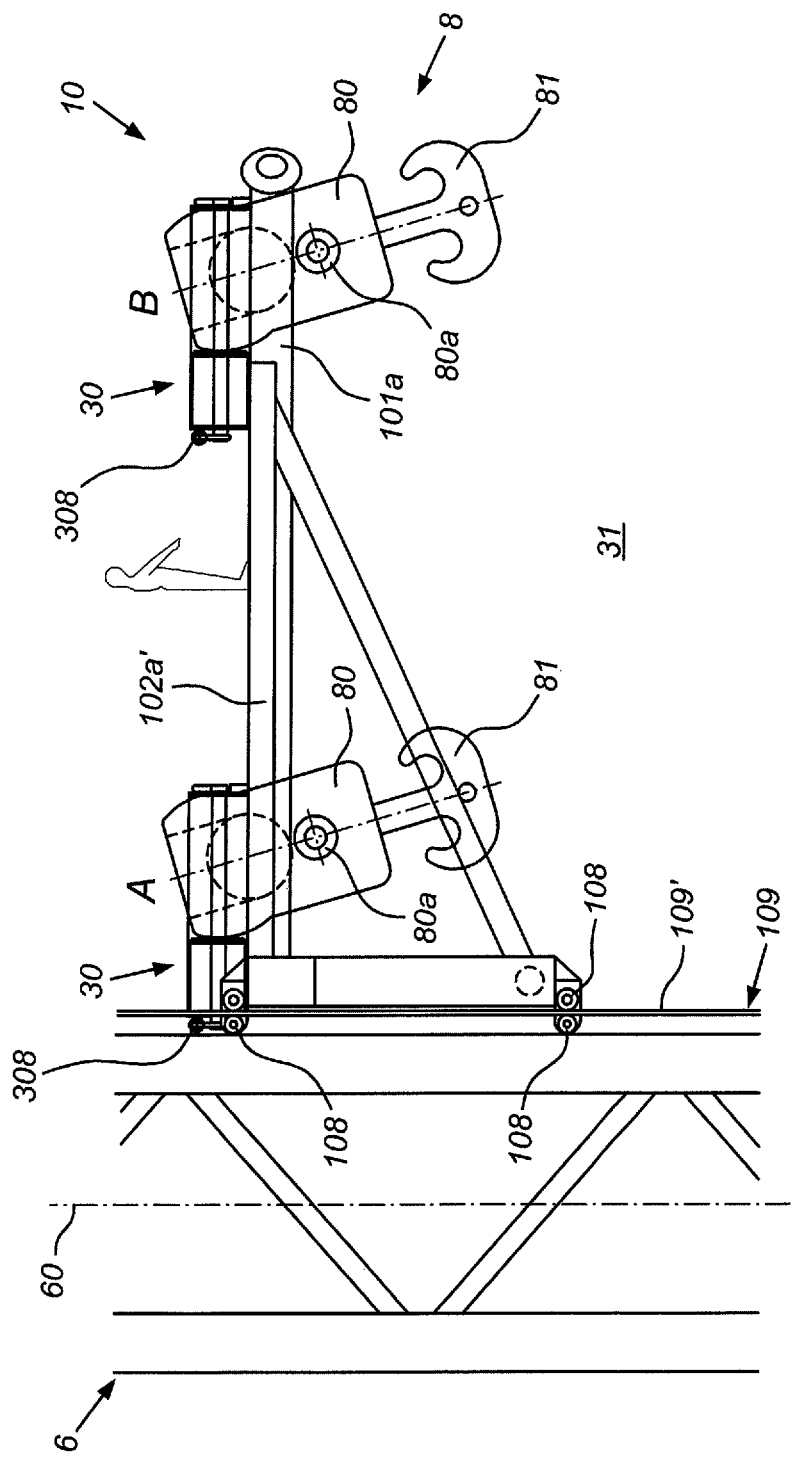

An embodiment of a guide device 10 is shown in more detail in FIGS. 2A, 2B and 2C. The shown guide device 10 comprises a frame of mutually connected beams, at least two beams (101a, 101b) of which extend parallel to lifting plane 31 from a rectangular base frame, which is formed by two transverse beams (103a, 103b) and two vertical beams (104a, 104b), from boom 6 in the direction of hoisting tackle 8, this substantially perpendicularly of the longitudinal axis 60 of boom 6. The frame is further reinforced by two inclining beams (102a, 102b) and two inclining beams (102a', 102b'). The length of the beams (101a, 101b) is such that they at least partially enclose hoisting tackle 8, and particularly hoisting block 80 thereof. When catching construction 30 according to the invention is not operational, the position of hoisting tackle 8 between beams (101a, 101b) depends on the degree to which the boom is luffed in and on the height of hoisting tackle 8. Because hoisting tackle 8 is suspended from main hoisting cable 7, the left-hand position A of hoisting block 80 shown in FIG. 2A will usually be reached by luffing in boom 6 such that the reach of the hoisting tackle corresponds to the centre line of foundation 3 of the turbine mast and the hoisting height of hoisting tackle 8 corresponds to the highest hoisting height required for a wind turbine component. The right-hand position B will generally be reached at the same boom position, although with a lower hoisting height required for wind turbine components, so in the case of wind turbines with shorter mast. The two beams (101a, 101b) preferably extend parallel to lifting plane 31 from boom 6 over a perpendicular distance 62 of a maximum of twice the boom width 63 in order to provide sufficient stiffness.

Figure 3A:
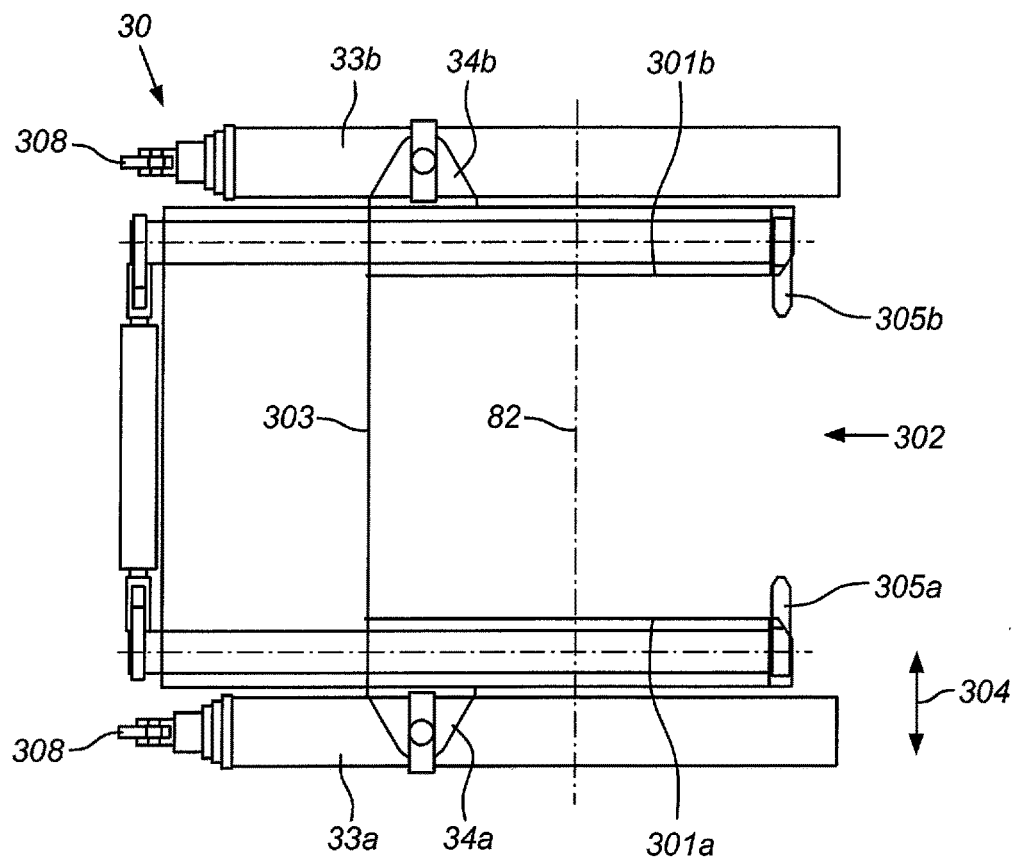
FIGS. 3A, 3B and 3C show respectively a schematic top side view, side view and front view of an embodiment of a catching construction according to the invention.

According to the invention guide device 10 is further provided with a catching construction 30 which is configured to receive hoisting tackle 8 and which is further displaceable (together with hoisting tackle 8 in enclosed position) in lifting plane 31 from a position A in the vicinity of boom 6 to a position B further removed from boom 6. Catching construction 30 is shown in more detail in FIGS. 3A, 3B and 3C, whereas FIGS. 2A, 2B and 2C show catching construction 30 as part of guide device 10.

Figure 3B:
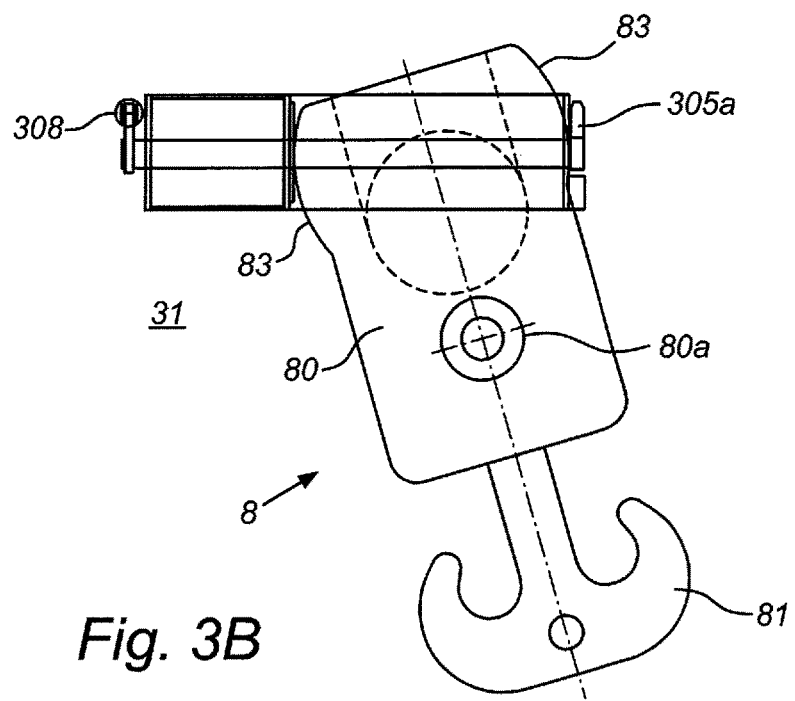
Figure 3C:
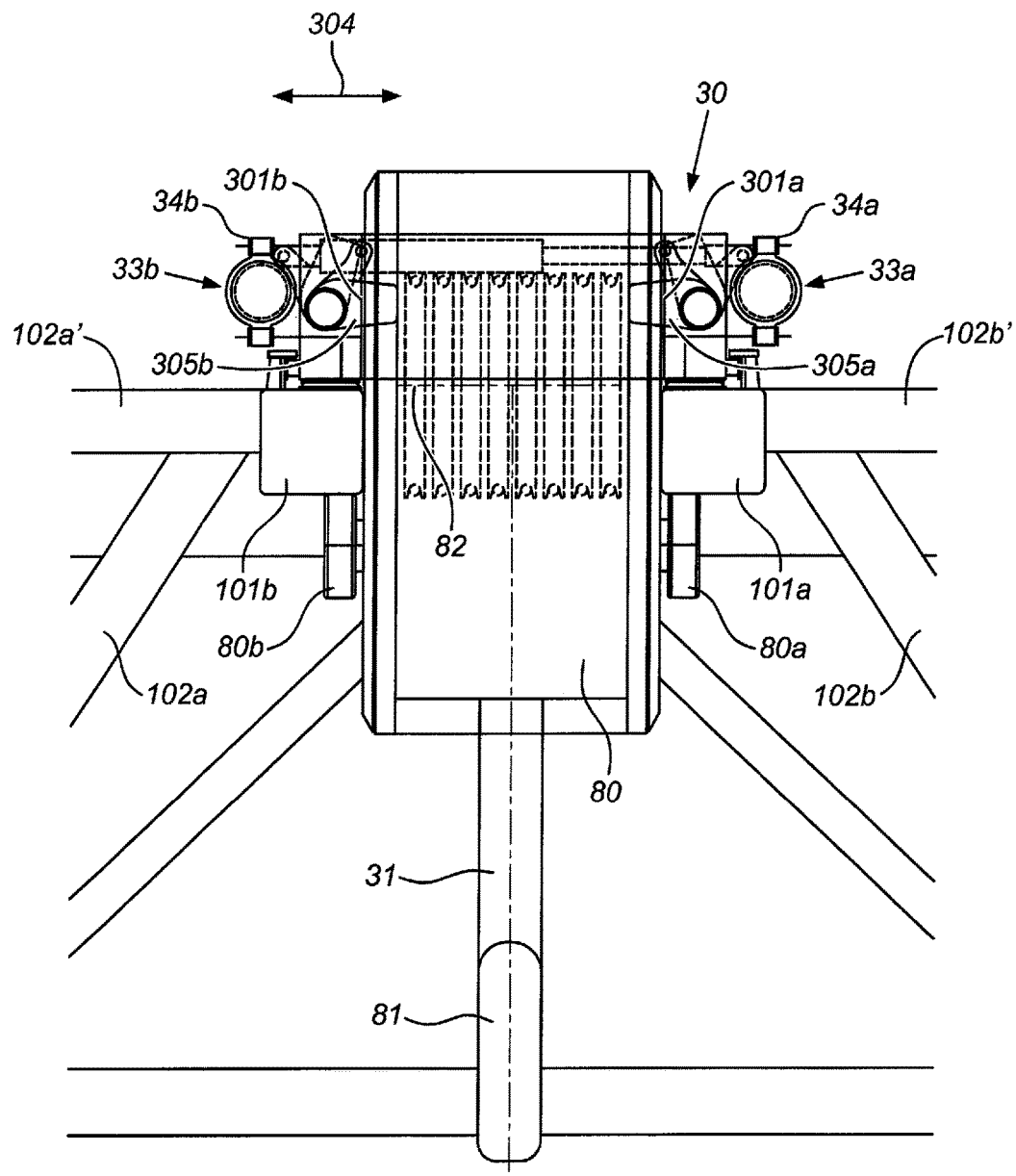

Catching construction 30 comprises a frame of mutually connected beams or wall parts. The wall parts comprise two side wall parts (301a, 301b), which extend parallel to the lifting plane 31 from boom 6 in the direction of hoisting tackle 8, a rear wall part 303 facing toward boom 6 and a front side 302 which is remote from boom 6 and at least temporarily accessible by hoisting tackle 8, or at least the hoisting block 80 thereof. Provided for this purpose in the plane of front side 302 are wall parts or catches (305a, 305b) retractable and extendable in a direction 304 transversely of lifting plane 31. With catches (305a, 305b) retracted the front side 302 is accessible by hoisting block 80 of hoisting tackle 8, whereas with catches (305a, 305b) extended the front side 302 allows at least the hoisting block 80 of a hoisting tackle 8 to be received in the space bounded by the wall parts (301a, 301b, 303, 305a and 305b). Receiving takes place such that there is sufficient clearance between said wall parts and the outer surface of hoisting block 80 so that in the received position hoisting block 80 (and so hoisting tackle 8) can rotate during use around a horizontal axis 82 running transversely of lifting plane 31. In order to make this rotation possible the outer surface 83 of hoisting block 80 is curved on the upper side thereof, whereby the cross-section parallel to lifting plane 31 is arcuate as shown in FIG. 3B.

Catching construction 30 is displaceable over beams (101a, 101b) of guide device 10 relative to guide device 10 by means of linear displacing means in the form of hydraulic piston cylinders (33a, 33b). Piston cylinders (33a, 33b) are connected via connecting plates (34a, 34b) to the frame of the catching construction, more specifically to wall parts (301a, 301b). Catching construction 30 with the hoisting block 80 enclosed therein can thus be displaced to a position A in the vicinity of boom 6 by retracting the hydraulic piston cylinders (33a, 33b). Catching construction 30 with the hoisting block 80 enclosed therein can be carried to a position B further removed from boom 6 by extending the hydraulic piston cylinders (33a, 33b). Hoisting tackle 8, together with a component, such as for instance a rotor blade 22, hooked fixedly thereon, can in this way be positioned with great precision relative to guide device 10, and so also relative to boom 6, this in a manner not susceptible to wind.

Guide device 10 provided with catching construction 30 is connected to boom 6 for displacement along, longitudinal axis 60 by means of a displacing device (108, 109, tensioning cable, hoisting sheave and winch). Guide device 10 and boom 6 are provided for this purpose with first and second co-acting guide means (108, 109) which, together with a tensioning cable, hoisting sheave and winch (not shown) mounted on guide device 10, form the displacing device. The first guide means comprise sets of wheels 108 arranged on the base frame (103, 104) and the second guide means comprise T-beams 109 connected to the side of boom 6 facing toward guide device 10. Each pair of wheels 108 encloses the flange of a corresponding T-beam 109, wherein wheels of a set of wheels 108 are situated on either side of the flange and roll thereover. Each set of wheels is particularly provided with a wheel which runs on flange 109' of the T-profile 109 provided on the boom box girder for the purpose of absorbing pressure forces and two running wheels running on the other side against flange 109' of T-profile 109 for the purpose of absorbing tension forces. Also provided if desired on one side of the boom are transverse rollers running on the end surface of flange 109' of T-profile 109 in order to hold guide device 10 on the rails in transverse direction. Depending on the wheel load, wheels can optionally be replaced by double wheel bogies. It is of course possible to realize other methods of displaceability along boom 6. Catching construction 30, and more specifically the hydraulic piston cylinders (33a, 33b) are provided with a fastening eye 308 fixedly connected to guide device 10 via transverse beam 103a. The (telescopic) hydraulic cylinders (33a, 33b) are therefore secured at the rod end to the guide frame. Cylinders (33a, 33b) push against this frame during outward movement in the direction of position B or pull thereon during inward movement in the direction of position A. Because catching construction 30 is connected (via rocker pins) to the cylinder surfaces, it co-displaces with the cylinder surfaces. The embodiment of catching construction 30 shown in the figures is provided with a sliding guide in the form of a T-shaped structure on longitudinal beams 101a and 101b on both sides of catching construction 30. Catching construction 30 cannot hereby undergo any displacement (except for the clearance in the guide) in a plane perpendicularly of main beams 101 of the guide device. Wheels can also be applied instead of a sliding guide.

Figure 5A:
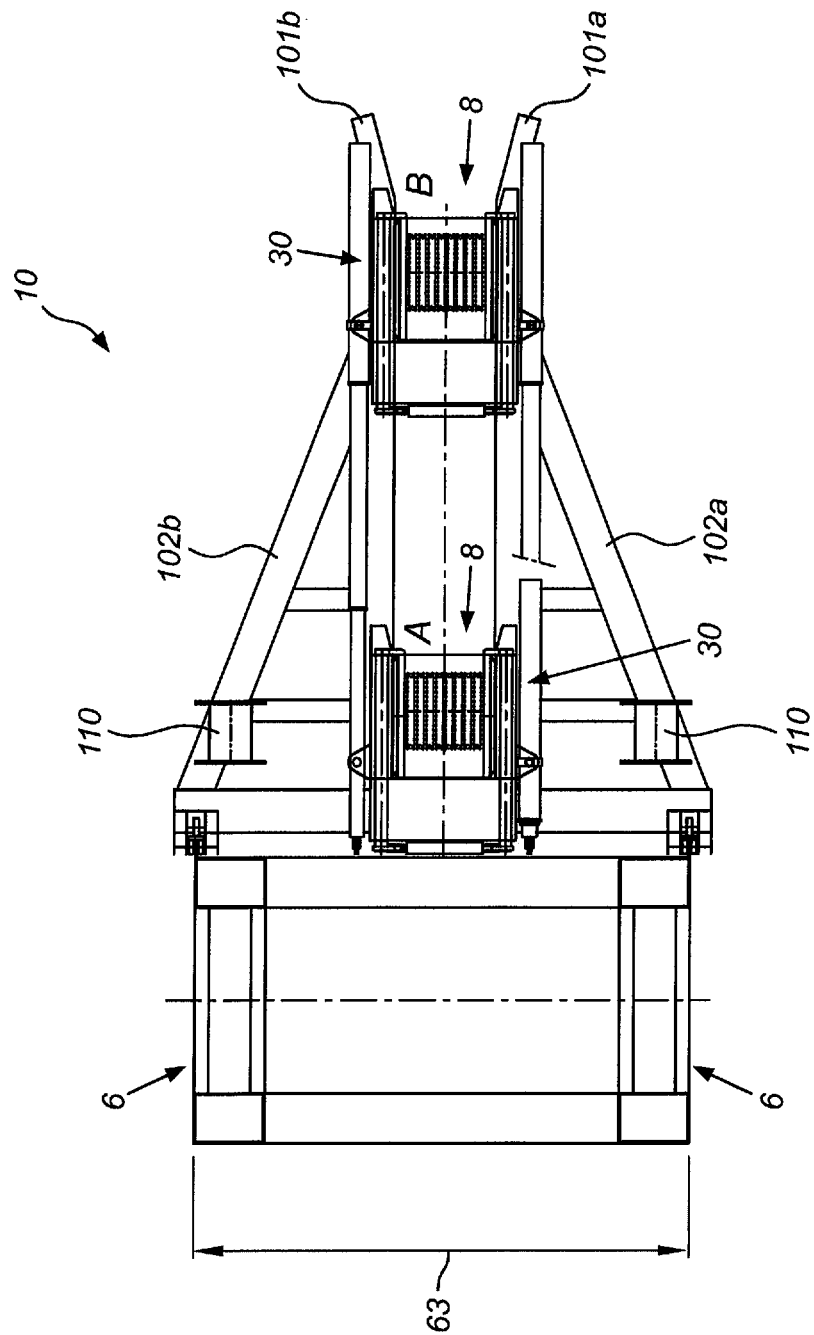
FIGS. 5A, 5B and 5C show respectively a schematic top side view, side view and front view of another embodiment of a guide device according to the invention.
Figure 5B:
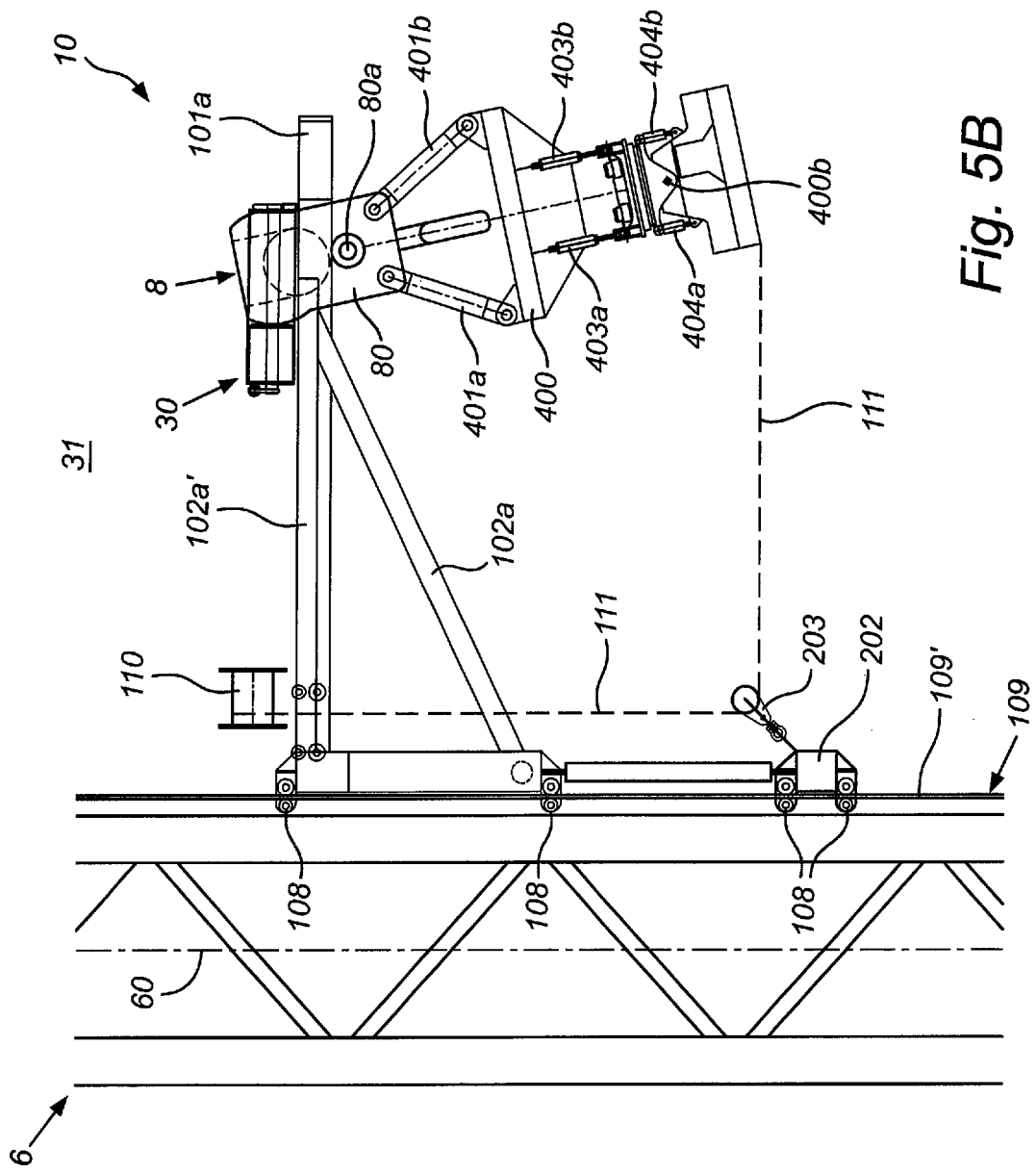

The tensioning cable (not shown) attached to guide device 10 is preferably operated by a constant tension winch (not shown) so that the tension force in the tensioning cable remains substantially constant and is kept at a generally relatively low value in the situation where the guide device is active and rests while applying little force on the wheels of hoisting tackle 8. The constant tension winch is situated for instance on boom 6, for instance on a transverse box girder in the area surrounding the hinge construction in the vicinity of hinge 6a, roughly in the centre of the boom. The hoisting sheave for the guide device is preferably situated at the upper outer end of boom 6. Guide device 10 can be provided if desired with auxiliary devices. As shown in FIG. 2C and FIGS. 5A, 5B, such an auxiliary device can comprise a tugger winch 110 and optional power sources (not shown). Running from tugger winch 110 is a guide cable 111 (tugger cable) which can be connected to a component connected to hoisting tackle 8. The component can be positioned in accurate manner by lengthening or shortening guide cable 111 using winch 110. Guide cable 111 can be connected to base frame (103, 104) in simple manner via a suspension frame (201, 202) which is connected to base frame (103, 104) and constructed from vertical beams 201 and a cross beam 202, which is likewise provided with sets of wheels 108 co-acting with T-beam 109. Cross beam 202 has sufficient length to suspend pulleys 203 from the outer ends such that the guide cables can engage roughly at a right angle on the component for lifting. This results in the most efficient guiding of the tugger system. Vertical beams 201 can also be hydraulic piston cylinders with which the distance between beam 202 and base frame (103, 104) can be varied. This is useful for giving guide cable 111 a favourable position relative to a component connected to hoisting tackle 8.

It is noted that in the embodiments discussed below and shown in FIGS. 4A, 4B, 5A, 5B, 5C, 6A, 6B and 7 the catching construction 30 of guide device 10 is omitted for the sake of clarity.

Figure 7:
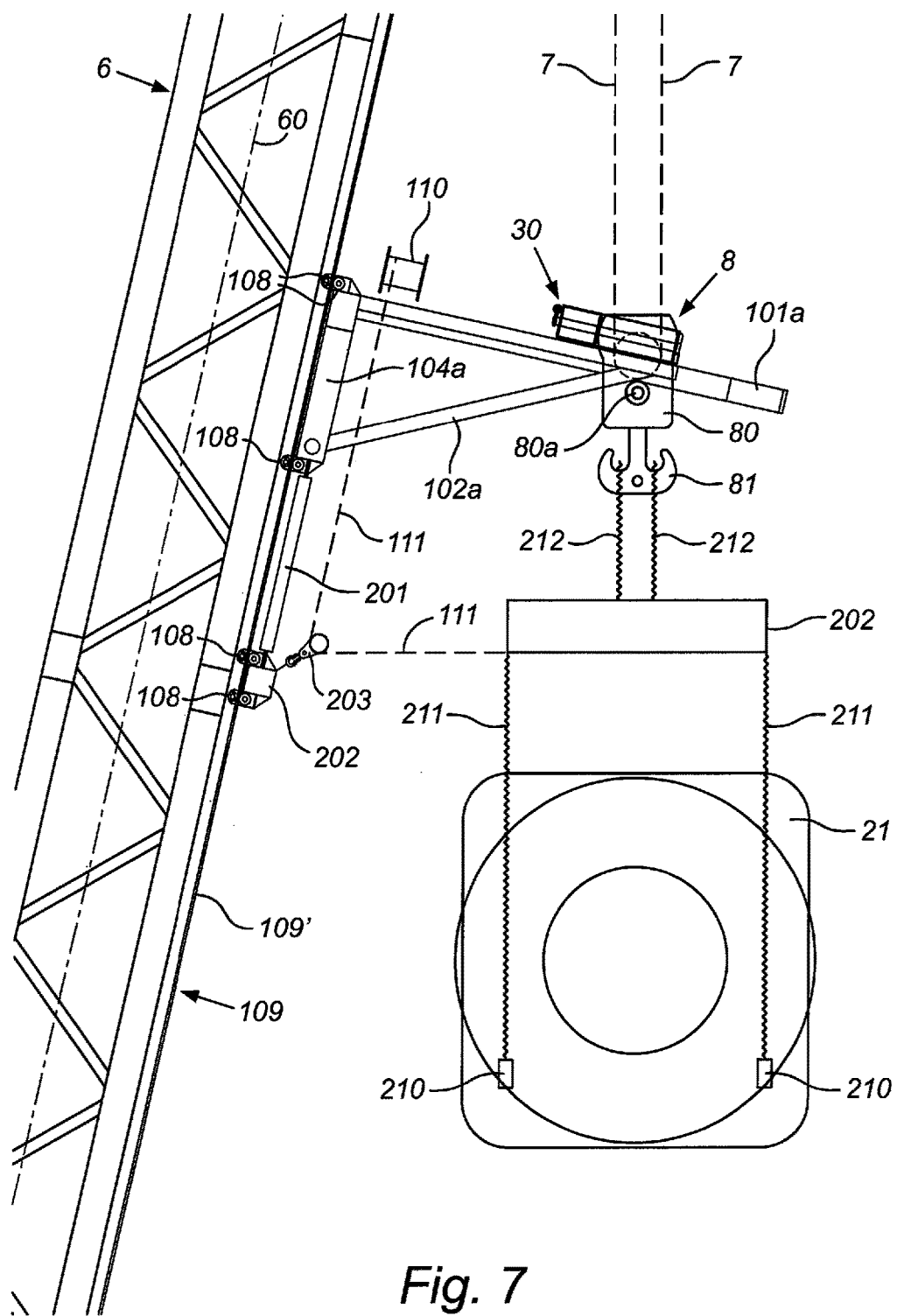
FIG. 7 is a schematic side view of yet another embodiment of a guide device according to the invention.
Figure 8:
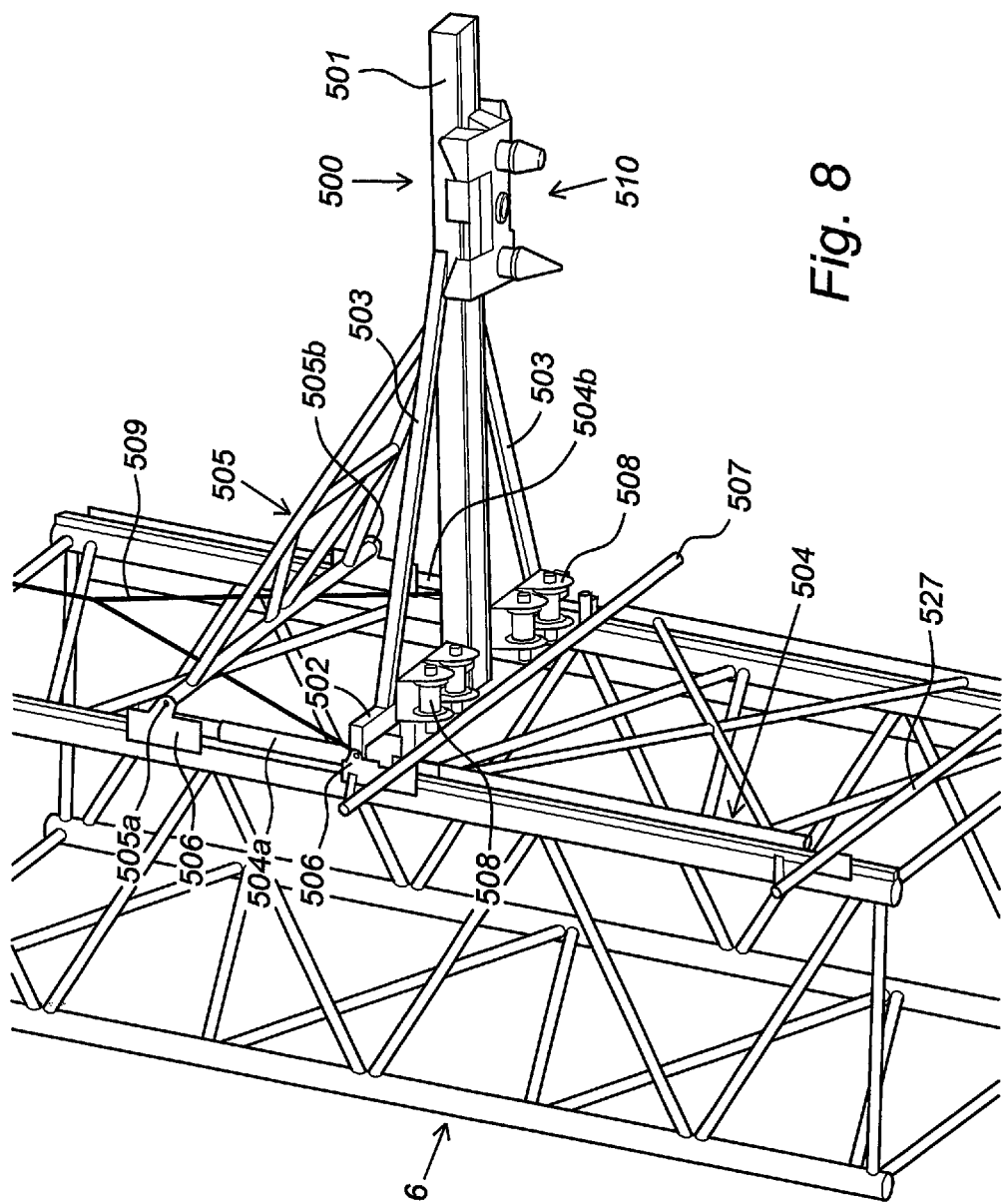
FIG. 8 is a perspective bottom view of yet another embodiment of a guide device with catching construction according to the invention.

As shown in FIG. 7, a nacelle 21 of a wind turbine can be taken up by a cross beam 202 which is connected by means of suspension cables 211 to lifting eyes 210 arranged on nacelle 21. Cross beam 202 is connected by means of suspension cables 212 to hoisting hook 81. By fixedly clamping hoisting tackle 80 to catching construction 30 of guide device 10 a connection which is substantially rigid but displaceable parallel to the lifting plane is obtained between hoisting tackle 8 and boom 6. Uncontrolled movements of nacelle 21 under the influence of wind and boom movements are hereby substantially prevented. The guide cables 111 connected to nacelle 21 enable precise control of the rotation of nacelle 21.

Figure 4A:
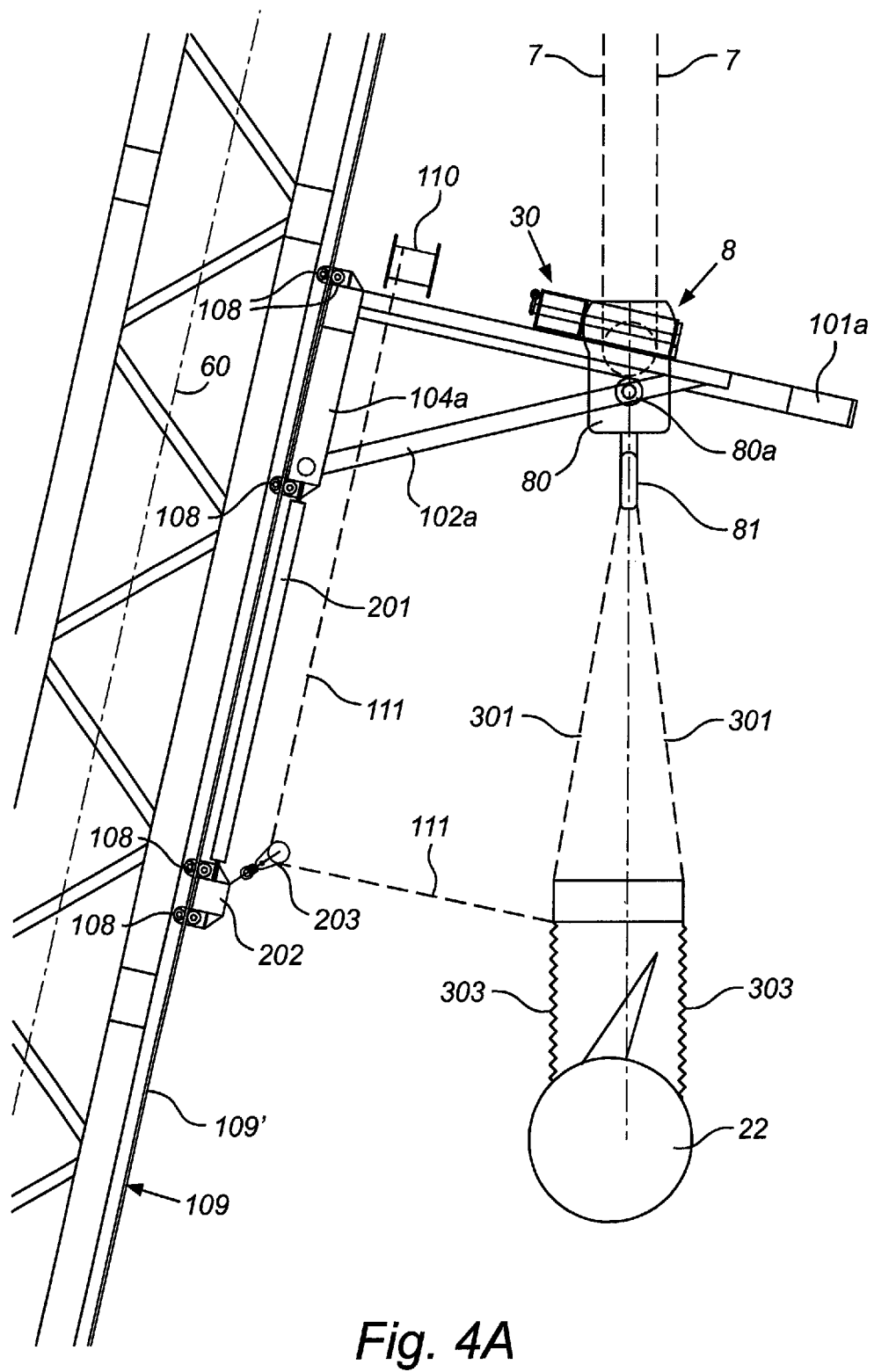
FIGS. 4A and 4B show respectively a schematic side view and front view of another embodiment of a guide device according to the invention.
Figure 4B:
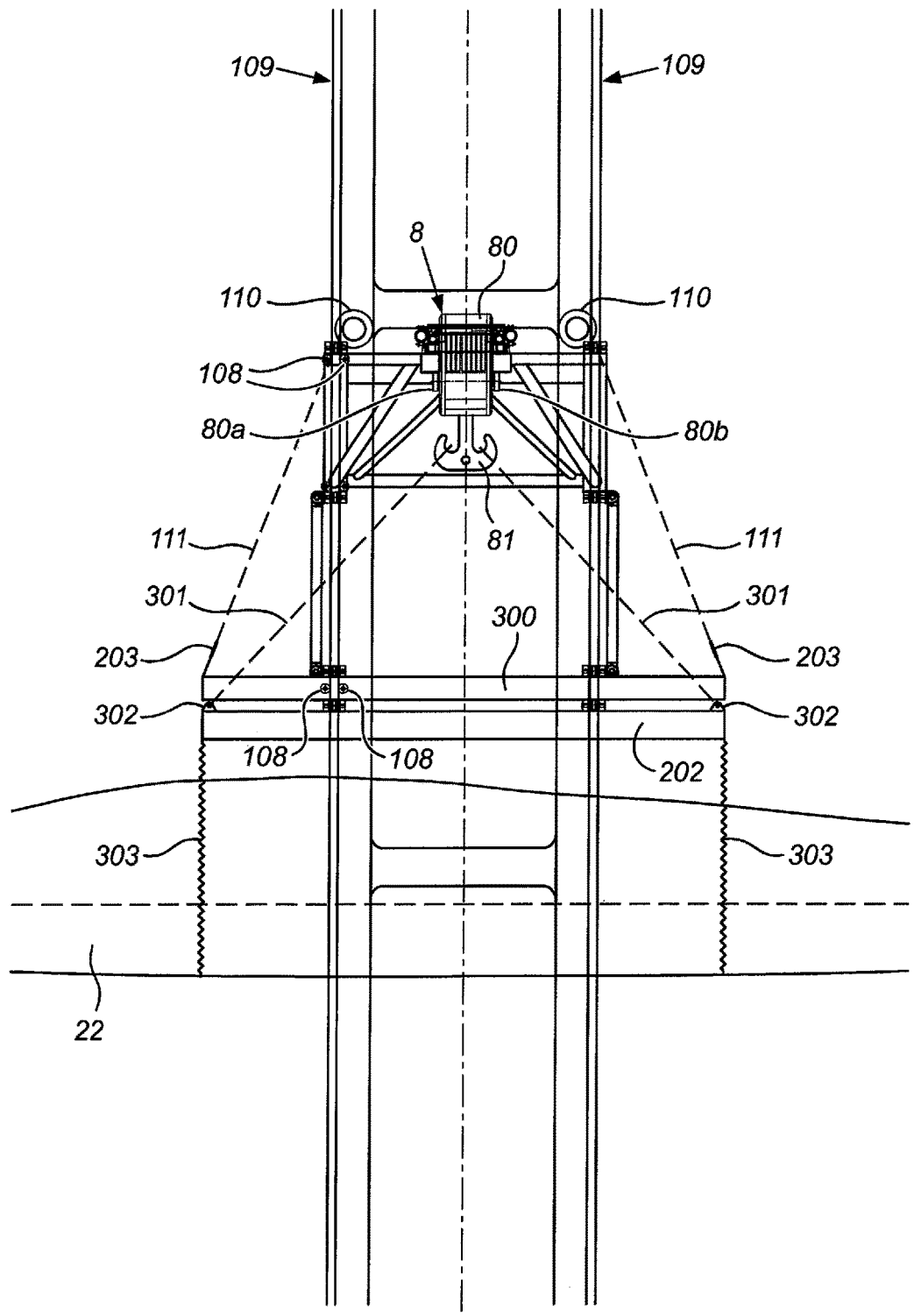

FIGS. 4A and 4B show an embodiment wherein hoisting tackle 8 is connected by means of a flexible connection to an attaching structure in the form of a hoisting yoke 300 which runs in transverse direction 61 and to which a wind turbine or rotor blade 22 is releasably attached. The flexible connection is formed by two suspension cables 301 running from lifting eye 81 to attachment points 302 arranged on hoisting yoke 300. Blade 22 lies in more or less horizontal position. Rotor blade 22 is suspended in slings 303 fastened to hoisting yoke 300.

Figure 5C:
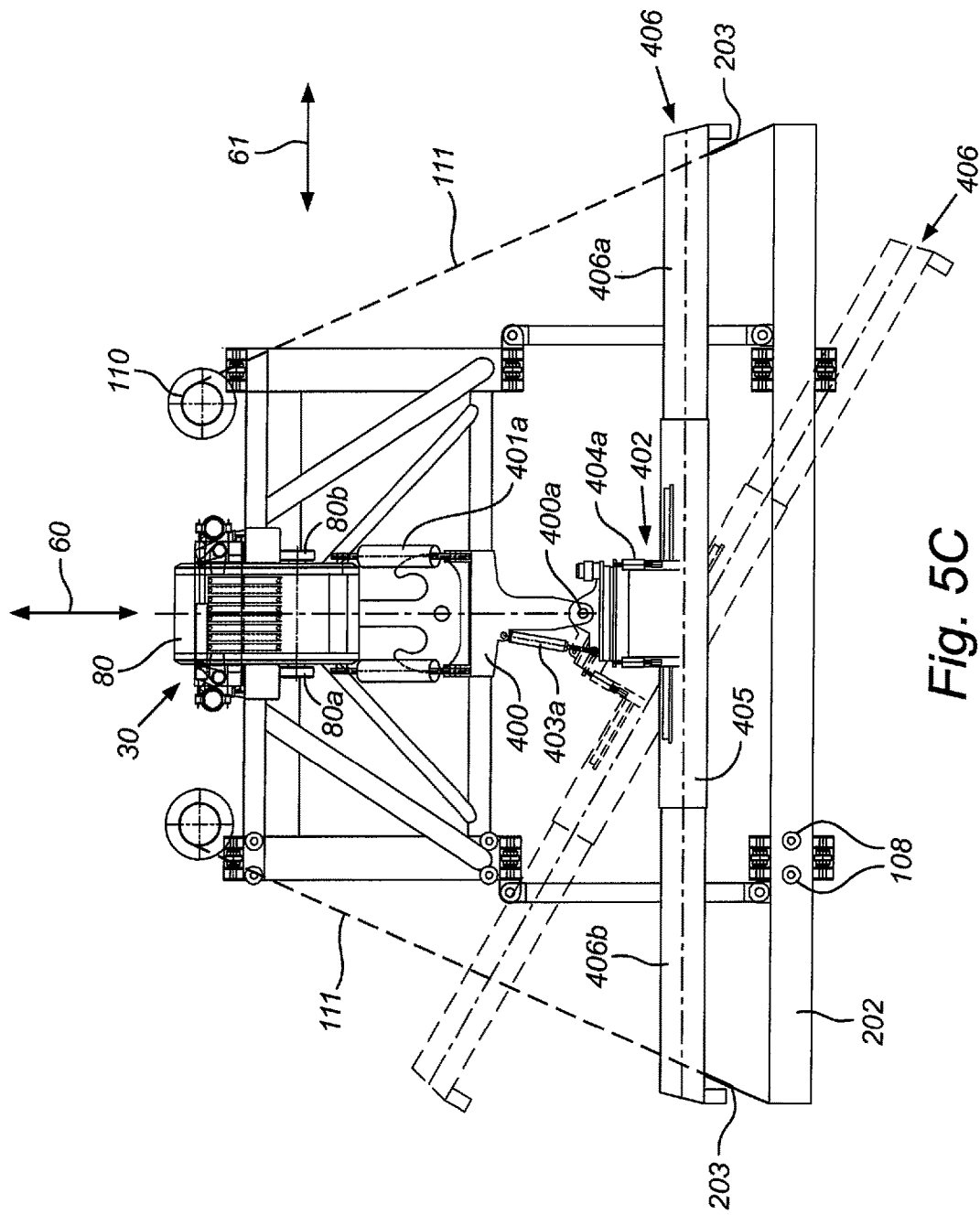
Figure 6A:
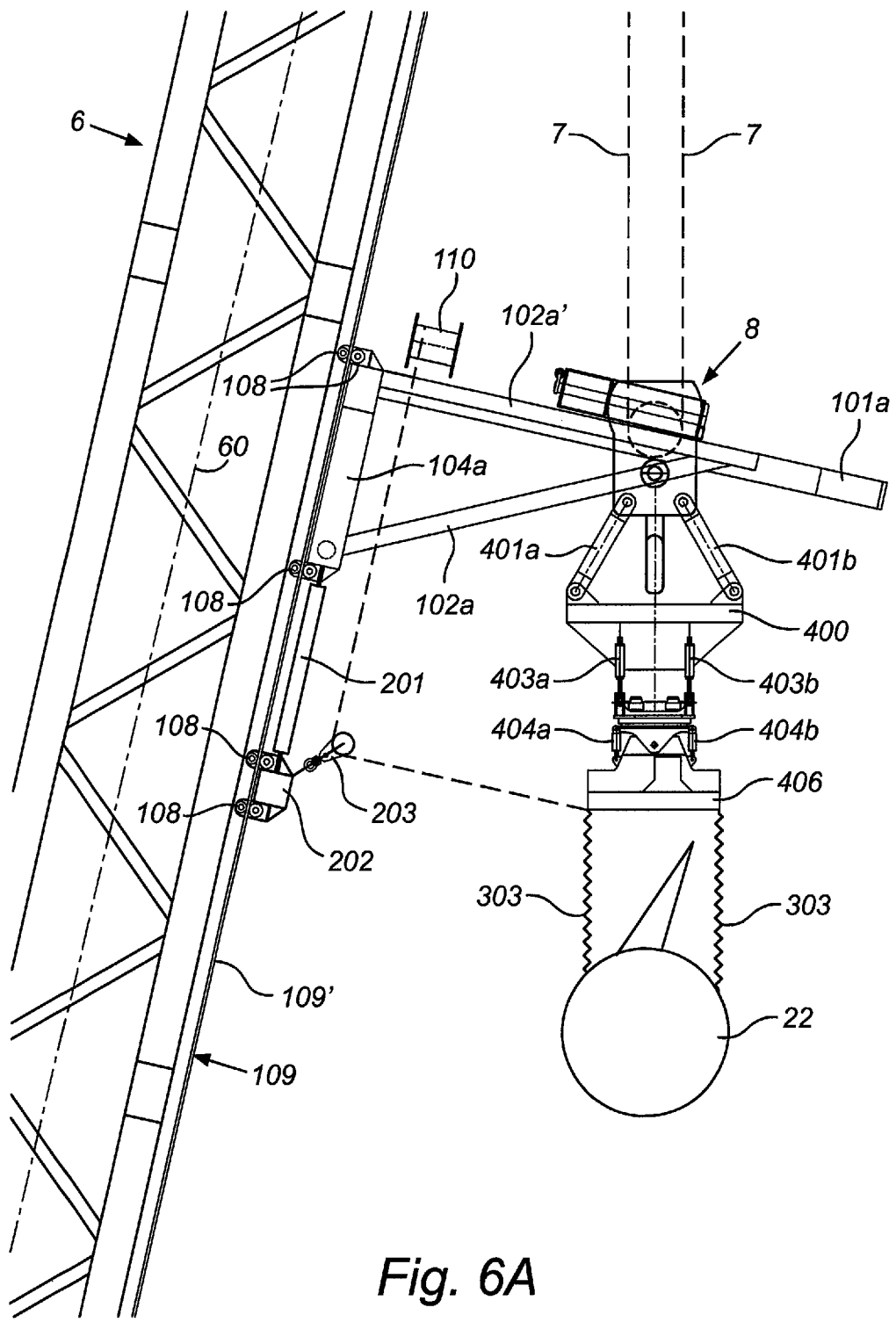
FIGS. 6A and 6B show respectively a schematic side view and front view of yet another embodiment of a guide device according to the invention.
Figure 6B:
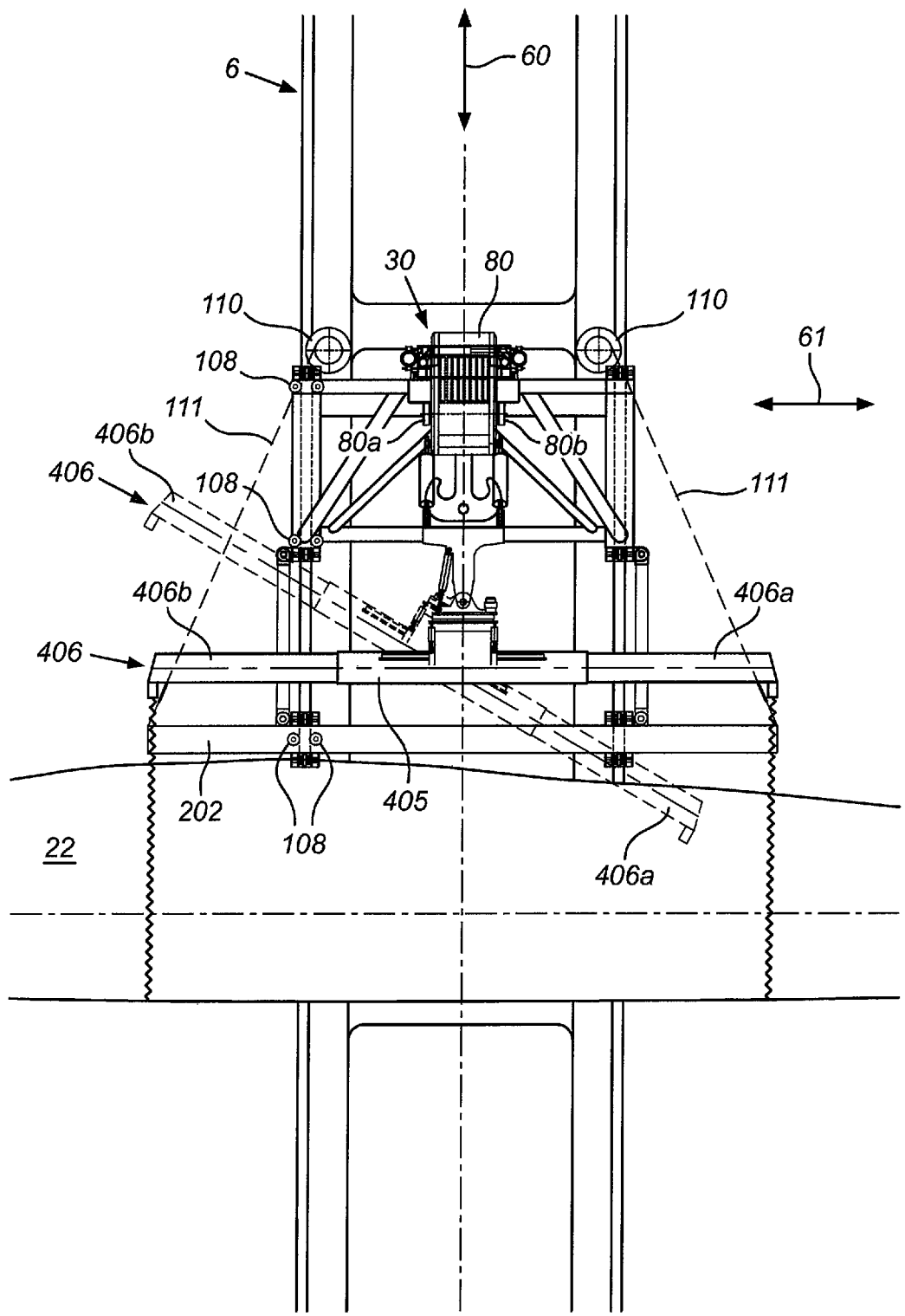

FIGS. 5A, 5B and 5C show an embodiment wherein hoisting tackle 8 is connected by means of a rigid connection to an attaching structure, likewise in the form of for instance a hoisting yoke or rotor blade spreader 406 running in transverse direction 61, to which a wind turbine or rotor blade 22 can be releasably attached, see FIGS. 6A and 6B. The rigid connection comprises a T-shaped bridging construction 400 connected with transverse connections (401a, 401b) to hoisting block 80. Bridging construction 400 bridges the hoisting hook 81. The rotor blade spreader construction 406 is connected thereto for rotation around hinge 400a, the connection in this embodiment forming an actuator 402 to which spreader 406 is connectable or of which it forms part. Actuator 402 is rotatable by means of hydraulic cylinders (403a, 403b) around axis 400a in a transverse direction 61. Actuator 402 and spreader 406 further comprise means for displacing and/or rotating parts of the attaching structure in three dimensions. A part 405 rotatable around a rotation axis 400b running perpendicularly of axis 400a can thus be rotated through the action of hydraulic cylinder 404a and/or 404b. This will likewise rotate the telescopically extendable arms (406a, 406b) of the rotor blade spreader 406. If desired, the length of spreader 406 is increased and adjusted to the component for lifting by extending the arms (406a, 406b).

A rotor blade 22 can be suspended in two slings 303 attached to the spreader, as already described above in an embodiment with a hoisting yoke 400 or 406. The combination of displacing and rotation actuators provides the option of precisely placing a wind turbine blade in a random orientation relative to boom 6, and thus also relative to support structure 3 and so also relative to a nacelle 21 mounted on mast 2.

It will be apparent that power supply means (not shown) such as batteries, motors, pumps and the like are present for the purpose of operating the different components of guide device 10, such as for instance the tugger winches and the hydraulic cylinders. It is also possible to place these provisions wholly or partially on crane structure 5, wherein the hydraulic hoses, electrical and mechanical cables and the like required for the purpose of actuating the components are run along the boom to guide device 10. The power supply means are however preferably provided on guide device 10 itself, and the required energy is carried via a so-called umbilical hoisting cable to guide device 10. An umbilical hoisting cable comprises a steel cable, the core of which comprises not a strand but for instance an electrical power supply cable. Energy can in this way be carried easily to guide device 10 via for instance slide rings in the hoisting winch drum. Power supply to the diverse actuators on the rotor blade spreader is provided most easily by electrical or hydraulic accumulators on the spreader itself. The operation of the diverse functions is performed most easily using radio remote control.

Yet another embodiment of a guide device with catching construction according to the invention is shown with reference to FIGS. 8-11B. Guide device 500 comprises a main beam 501 which is rigidly connected to a cross beam 502 and reinforced with two side beams 503. Beams (501,503) together form a fork-like structure. Cross beam 502 is mounted on a trolley 504 which is displaceable on a hoisting cable 509 in a longitudinal direction of boom 6 by means of guide means 506, as already described above for other embodiments. When the angular position of boom 6 changes, main beam 501 can be held in a substantially horizontal position by a support frame 505 connected hingedly to trolley 504 at base angular points (505a, 505b). By imparting a movement to hydraulic or electric cylinders (504a, 504b) received in trolley 504 the base angular points (505a, 505b) come to lie in a higher position, whereby the angular position of the main beam changes relative to the boom direction. The angular position changes in the opposite direction when cylinders (504a, 504b) are retracted. Using a tugger beam 507 provided with winches 508 an attaching means 520 coupled to guide device 500 can if desired be manipulated with tugger cables. Using a second tugger beam 527 a structural component coupled to attaching means 520 can if desired be manipulated with tugger cables.

Main beam 501 is provided on the underside thereof with a catching construction 510 or carriage. Catching construction 510 can move in longitudinal direction of main beam 501 over main beam 501 by means of a horizontal guide wheels 514 and vertical guide wheels 515 which are driven electrically by one or more drives 516. Catching construction 510 is configured to couple to guide device 500 an attaching means 520 for an elongate object for placing.

Figure 10:
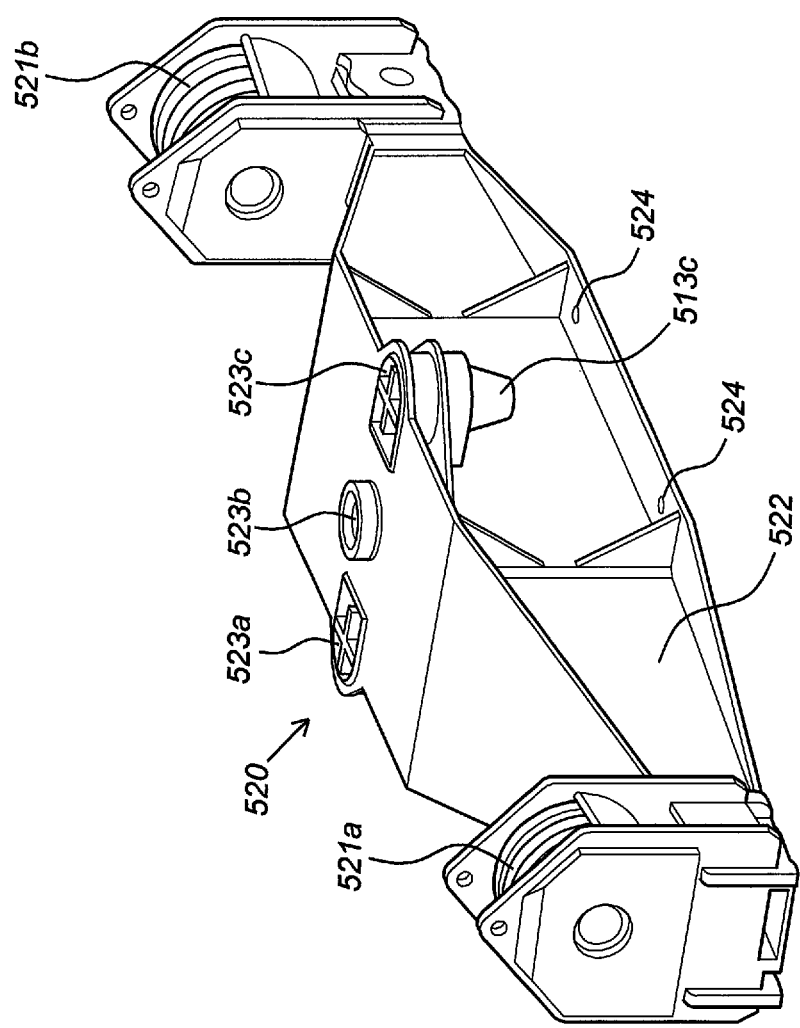
FIG. 10 is a perspective top view of an attaching means which can co-act with the catching construction shown in FIG. 9.
Figure 11A:
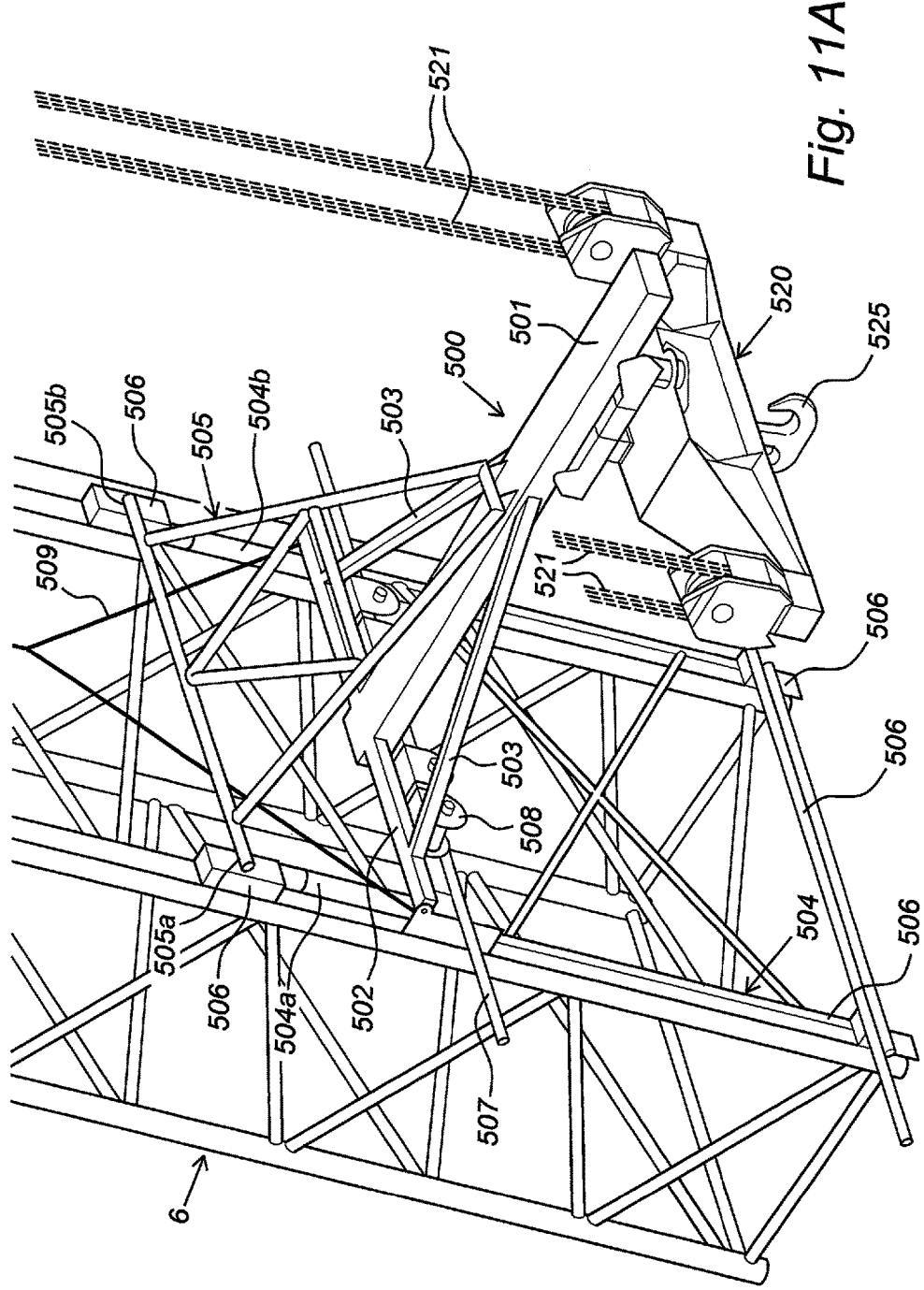
FIGS. 11A and 11B show respectively a schematic perspective top view and bottom view of an embodiment of a guide device according to the invention.
Figure 11B:
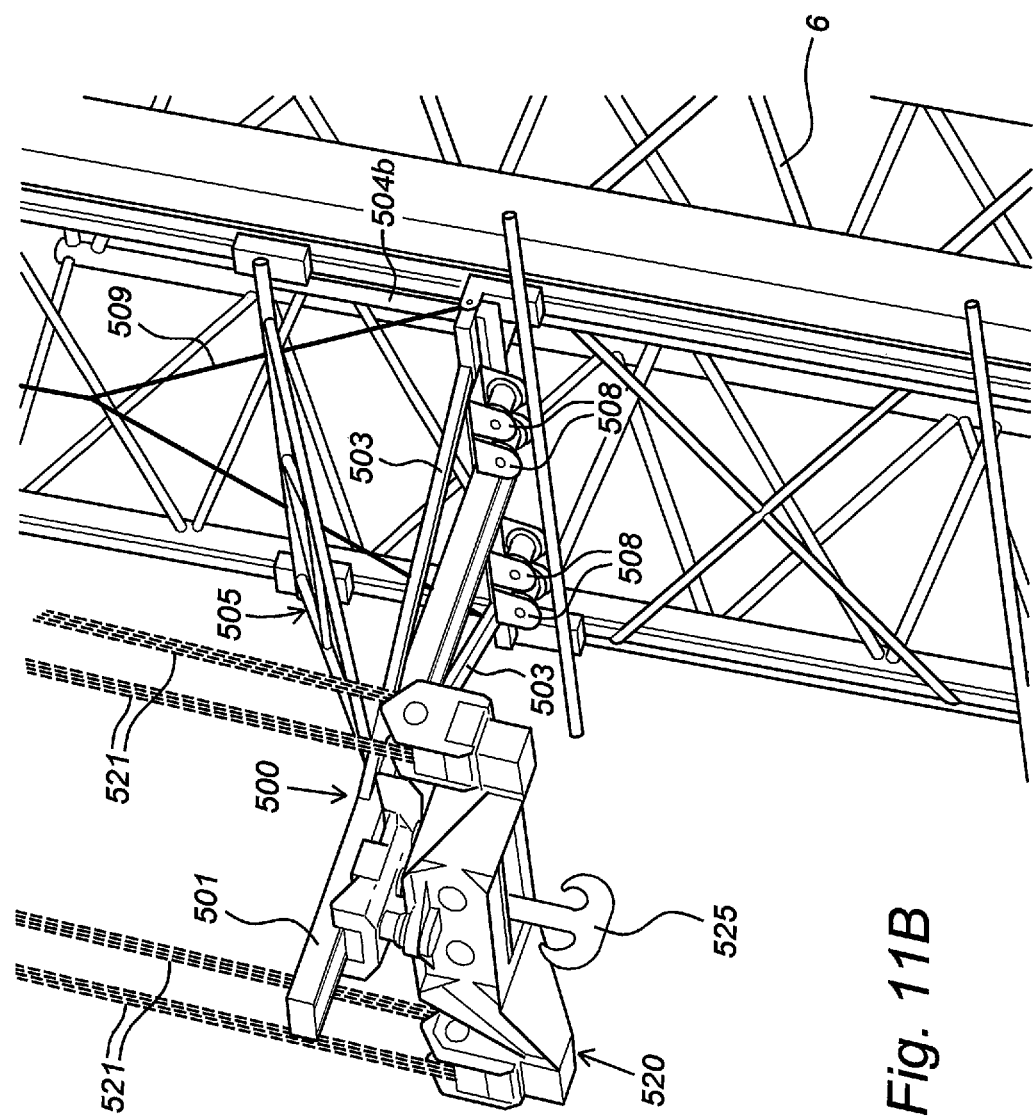

Referring to FIG. 10, a suitable attaching means 520 comprises a crossbar 522 which can be suspended from a double hoisting tackle 521 by means of two tackle blocks (521a, 521b) provided with cable sheaves. The crossbar comprises three connection points (523a, 523b, 523c) for coupling to catching construction 510. Two openings (523a, 523c) are provided for the purpose of receiving corresponding pins (513a, 513c) of carriage 510. A male spherical contact surface comparable to a ball joint provided between the two openings (523a, 523c) is configured to co-act fittingly with a female spherical contact surface arranged between the two pins (513a, 513c) on the underside of carriage 510. Both spherical surfaces (513b, 523b) provide for a (substantially vertical) coupling between the crossbar 522 suspended from hoisting tackles 521 and the catching construction or carriage 510. Crossbar 522 is designed such that the centre line of the cable sheaves in both tackle blocks (521a, 521b) run through the ball joint (513b, 523b). Substantially no torsional forces are exerted on carriage 510 as a result. The main tackle blocks (521a, 521b) are connected releasably to crossbar 522 and an individual hoisting hook can be attached thereto. If desired, crossbar 522 is provided on the underside thereof with fastening means 524 with which for instance a Blade Squid can be rigidly connected to crossbar 522. Crossbar 522 further comprises a hoisting hook 525 which is arranged on the underside and to which a component for placing can be attached.

Figure 9:
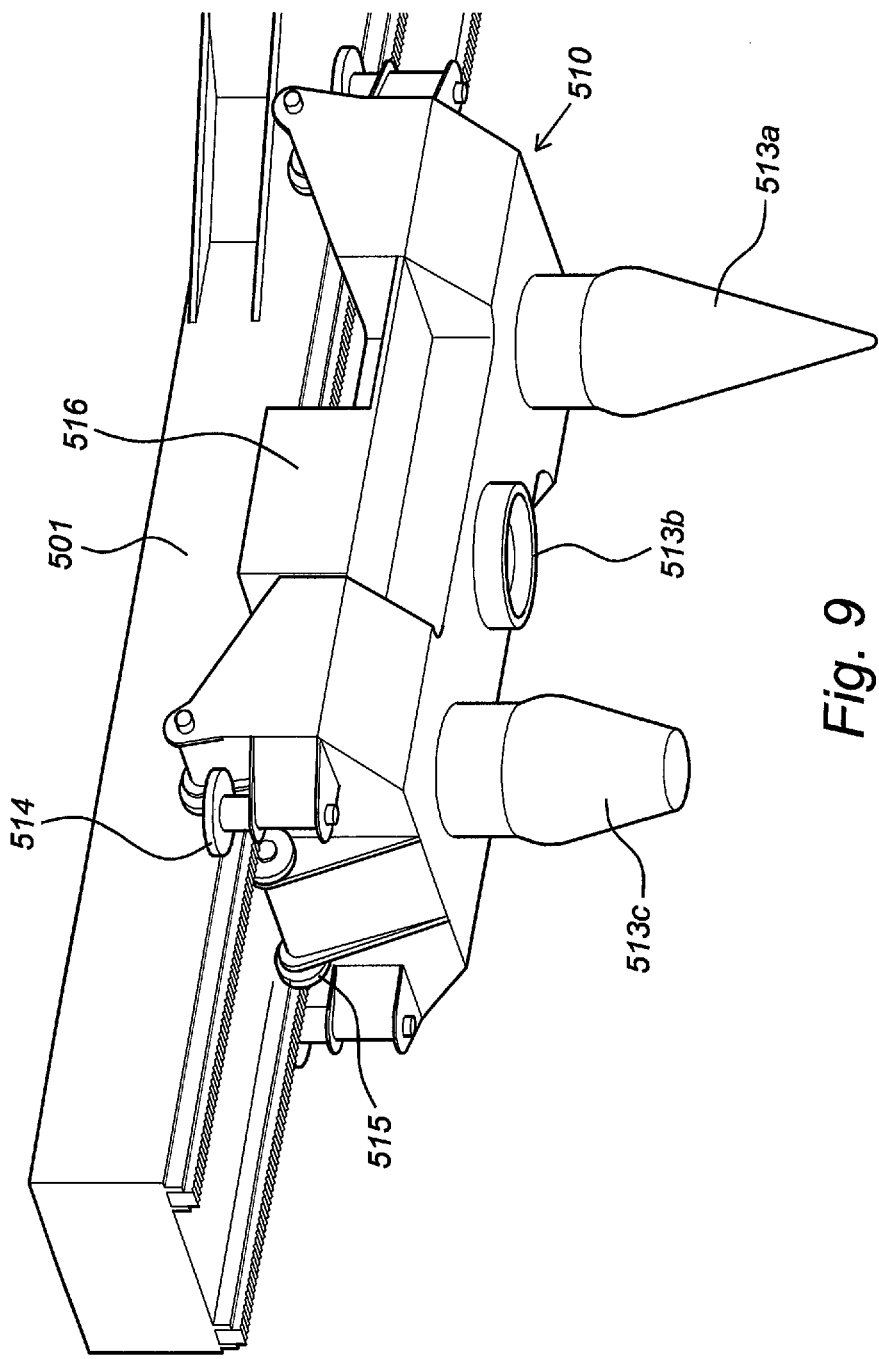
FIG. 9 is a perspective bottom view of the catching construction of the embodiment shown in FIG. 8.

As shown in FIG. 9, the two pins (513a, 513c) of catching construction 510 have a differing of height, which facilitates engagement of attaching means 520. The longer (rear) pin 513a does indeed engage first on the corresponding opening 523a of crossbar 522, after which the shorter (front) pin 513c brings about the complete coupling. The coupling between the two spherical surfaces (513b, 523b) then ensures that crossbar 522 is balanced and that substantially no torsional forces are transmitted to carriage 510.

FIGS. 1A-1B finally illustrate the placing of a nacelle 21 on a wind turbine mast 2 with a method according to the invention. The method comprises of providing a device 1 according to the invention on a vessel 4 and placing a component from vessel 4 onto a support structure 3 present at sea using hoisting means 5, wherein the movement of hoisting tackle 8 is temporarily limited in at least one direction by guide device 10 by means of displacing the displacing device (108, 109, tensioning cable) from the highest position in the boom along longitudinal axis 60 of boom 6 to the position of hoisting tackle 8. After guide device 10 has come into contact with wheels 80a of hoisting tackle 8, the hoisting winch of guide device 10 is set into constant tension operation. During lifting and paying out of hoisting tackle 8 the guide device 10 therefore continues to follow hoisting tackle 8 passively because the guide device rests while applying little weight on the wheels (80a, 80b) of hoisting tackle 8. In this situation the transverse movement of hoisting tackle 8 in direction 61 is prevented by beams 101a, 101b. When boom 6 is at the right angle to be able to reach the centre line of support structure 3, hoisting tackle 8 is received in catching construction 30 (not shown in FIGS. 1A and 1B), whereby the movement of hoisting tackle 8 relative to guide device 10 is substantially prevented when catching construction 30 is in stationary position. According to the invention a fine positioning which is substantially not susceptible to wind influences can now take place by displacing catching construction 30 with hoisting tackle 8 received therein parallel to the lifting plane between a position in the vicinity of boom 6 and a position further removed from boom 6 and/or vice versa.

Nacelle 21 is connected with a usual hoisting yoke and hoisting cables (slings) to hoisting tackle 8. The method according to the shown embodiment comprises the steps, among others, of taking up nacelle 21 from work deck 41 of vessel 4 to a first position X using hoisting tackle 8, wherein guide device 10 is held in a high position of boom 6 so that hoisting tackle 8 can move freely and boom 6 acts as a boom 6 of a known crane. Hoisting tackle 8 can hereby move in simple manner on and along work deck 41, for instance in storage racks for the components, without this movement being impeded by guide and clamping devices mounted on boom 6. Boom 6 is then tilted upward around rotation shaft 6a (luffed in) until it runs so steeply that hoisting cable 7 of hoisting tackle 8 comes within reach of guide device 10 (in a direction transversely of boom 6). Guide device 10 is then displaced along the longitudinal axis 60 of boom 6 roughly to the position of hoisting tackle 8, wherein guide device 10 rests on the wheels (80a, 80b) of hoisting tackle 8, after which the hoisting winch (not shown) of guide device 10 is set into constant tension operation so that guide device 10 passively follows the displacements of boom 6 and hoisting tackle 8. Nacelle 21 is then hoisted from a position X' to a position Y, wherein guide device 10 passively follows the movement of hoisting tackle 8. Boom 6 is subsequently pivoted around rotation axis 51 to a position in the vicinity of the desired assembly position (see FIG. 1B). Hoisting tackle 8 is engaged fixedly with catching construction 30 of guide device 10 in the manner described above in detail, and boom 6 is optionally tilted a little further until nacelle 21 is situated in the desired assembly position. Hoisting tackle 8 can be moved further up and downward in the engaged position by paying out the hoisting tackle cable to a position against or on the already available support structure 3 or other already placed components. The position of catching construction 30 is modified here such that the hoisting cables continue to run in substantially vertical direction.

The above described operations are repeated as often as components have to be placed.

The invention is not limited to the embodiments shown in the figures, and many variants thereof are possible within the scope of protection of the appended claims. It is thus possible for instance to place rotor blades 22 individually or, conversely, to mount one or more rotor blades 22 on the hub or nacelle 21 (for instance in so-called bunny ear form) and to place the whole on support structure 3 using the described device and method.

The invention claimed is:

1. A device for placing components of a structure comprising a hoisting means placed on a surface, a boom of which is provided with a hoisting cable with attaching means, such as a hoisting tackle, to which a component for placing can be attached, wherein a lifting plane is defined by the boom and the free-hanging hoisting cable, wherein the boom further comprises a guide device for the attaching means which is connected to the boom by means of a displacing device displaceable along a longitudinal axis of the boom, and the guide device is configured to limit movement of the attaching means in a direction running transversely of the lifting plane, wherein the guide device further comprises a catching construction configured to receive and displace the attaching means parallel to the lifting plane between a position in the vicinity of the boom and a position further removed from the boom and/or vice versa, and wherein the guide device further comprises a frame of mutually connected beams, of which at least one beam extends parallel to the lifting plane from the boom in the direction of the attaching means and at least partially restrains the attaching means, and that the catching construction is displaceable over the at least one beam.

2. The device as claimed in claim 1, wherein the catching construction is displaceable parallel to the lifting plane between a position in the vicinity of the boom and a position further removed from the boom and/or vice versa.

3. The device as claimed in claim 1, wherein an outer surface of the attaching means is formed such that at different angles to the vertical direction the attaching means can nevertheless be received close-fittingly in the catching construction.

4. The device as claimed in claim 1, wherein the at least one beam extends substantially perpendicularly of the longitudinal axis of the boom.

5. The device as claimed in claim 1, wherein the catching construction comprises a frame of mutually connected walls, two side walls of which extend parallel to the lifting plane from the boom in the direction of the attaching means, a rear wall of which is directed toward the boom and a front side of which remote from the boom is accessible by the hoisting means.

6. The device as claimed in claim 5, wherein the front side comprises wall parts, such as catches, retractable and extendable in a direction transversely of the lifting plane, wherein the front side with retracted wall parts is accessible by the hoisting means and the front side with extended wall parts encloses the attaching means present in the catching construction.

7. The device as claimed in claim 1, further comprising linear displacing means for displacing the catching construction in a direction parallel to the lifting plane between a position in the vicinity of the boom and a position further removed from the boom and/or vice versa.

8. The device as claimed in claim 1, wherein the displacing device comprises first guide means provided on the guide device and/or the catching construction and second guide means provided on the boom which co-act with the first guide means.

9. The device as claimed in claim 8, wherein the first guide means comprise a pair of wheels, the second guide means a T-beam, and that the pair of wheels encloses a flange of the T-beam.

10. The device as claimed in claim 8, wherein the displacing device is configured such that the guide device and the catching construction follow the displacement of the attaching means.

11. The device as claimed in claim 10, wherein the displacing device comprises a tensioning cable attached to the guide device and/or the catching construction and operated by a constant tension winch so that the tension force in the cable remains substantially constant.

12. The device as claimed in claim 1, wherein the guide device comprises auxiliary devices.

13. The device as claimed in claim 1, wherein the device comprises angle adjusting means configured to adjust the angle of the guide device to the boom.

14. The device as claimed in claim 13, wherein the angle adjusting means are configured such that the adjusting means hold the guide device substantially horizontal irrespective of the angular position of the boom.

15. The device as claimed in claim 1, wherein the catching construction is provided with pins and/or openings which can couple to respective openings and/or pins provided in the attaching means.

16. The device as claimed in claim 1, wherein the catching construction is provided with a first spherical contact surface which can couple to a second spherical contact surface of the attaching means.

17. The device as claimed in claim 1, wherein the attaching means is connected by means of a rigid or flexible connection to an attaching structure to which the component can be releasably attached.

18. The device as claimed in claim 17, wherein the rigid connection and/or the attaching structure comprises means for displacing and/or rotating respectively the attaching structure and/or parts of the attaching structure in three dimensions.

19. The device as claimed in claim 17, wherein the attaching structure comprises a blade yoke, a rotor blade spreader, a gripper and/or slings for holding the component.

20. The device as claimed in claim 1, wherein the component comprises a mast section, a rotor blade and/or a nacelle of a wind turbine.

21. The device as claimed in claim 1, wherein the surface comprises a vessel, in particular a jack-up platform.

22. A method for placing components of a structure, the method comprising of providing a device according to claim 1 on a surface and placing the components on an available support structure using the hoisting means, wherein the movement of the attaching means is temporarily limited by the guide device by means of displacing the displacing device along the longitudinal axis of the boom to the position of the attaching means, receiving in the catching construction and displacing the attaching means parallel to the lifting plane between a position in the vicinity of the boom and a position further removed from the boom and/or vice versa.

23. The method as claimed in claim 22, wherein the guide device is displaced by means of a tensioning cable attached thereto with a substantially constant tension force along the longitudinal axis of the boom.

24. The method as claimed in claim 22, comprising the steps of:
  a) taking up a component with the attaching means or the attaching structure;
  b) tilting the boom upward until it runs so steeply that the attaching means comes within reach of the guide device;
  c) displacing the guide device along the longitudinal axis of the boom until it rests on the wheels of the attaching means, after which the hoisting winch of the guide device is set into constant tension operation so that the guide device follows passively the displacements of boom and attaching means;
  d) pivoting the boom into the vicinity of the desired assembly position;
  e) tilting the boom until the component is in the desired assembly position;
  f) receiving the attaching means in the catching construction;
  g) positioning the component in the desired assembly position by displacing the attaching means parallel to the lifting plane from a position in the vicinity of the boom to a position further removed from the boom and/or vice versa; and
  h) connecting the component to the support structure.

25. The method as claimed in claim 22, wherein the component comprises a mast section, a rotor blade and/or a nacelle of the wind turbine.

26. The method as claimed in claim 25, wherein the component comprises a rotor blade of a wind turbine, and this rotor blade is hoisted and mounted in a substantially vertical position on a hub of the wind turbine.

27. The method as claimed in claim 22, wherein the surface comprises a vessel, and the components are placed on a support structure available at sea.

28. A device for placing components of a structure comprising a hoisting means placed on a surface, a boom of which is provided with a hoisting cable with attaching means, such as a hoisting tackle, to which a component for placing can be attached, wherein a lifting plane is defined by the boom and the free-hanging hoisting cable, wherein the boom further comprises a guide device for the attaching means which is connected to the boom by means of a displacing device displaceable along a longitudinal axis of the boom, and the guide device is configured to limit movement of the attaching means in a direction running transversely of the lifting plane, wherein the guide device further comprises a catching construction configured to receive and displace the attaching means parallel to the lifting plane between a position in the vicinity of the boom and a position further removed from the boom and/or vice versa,
  wherein the displacing device comprises first guide means provided on the catching construction and second guide means provided on the boom which co-act with the first guide means, and
  wherein the first guide means comprise a pair of wheels, the second guide means a T-beam, and that the pair of wheels encloses a flange of the T-beam.

* * * * *